(12) United States Patent
Sunbeck

(10) Patent No.: US 7,708,676 B2
(45) Date of Patent: *May 4, 2010

(54) "FIGURE-EIGHT" TRACK, APPARATUS, METHOD, AND GAME FOR SENSORY-MOTOR EXERCISE

(76) Inventor: Deborah T. Sunbeck, 151 Panorama Trail, Rochester, NY (US) 14625-1843

( * ) Notice: Subject to any disclaimer, the term of this patent is extended or adjusted under 35 U.S.C. 154(b) by 650 days.

This patent is subject to a terminal disclaimer.

(21) Appl. No.: 11/541,992

(22) Filed: Oct. 2, 2006

(65) Prior Publication Data

US 2007/0032352 A1 Feb. 8, 2007

Related U.S. Application Data

(63) Continuation-in-part of application No. 10/223,444, filed on Aug. 20, 2002, now Pat. No. 7,115,071.

(51) Int. Cl.
*A63B 71/00* (2006.01)
(52) U.S. Cl. .................... 482/148; 482/8; 482/75; D21/668
(58) Field of Classification Search ............... 482/148, 482/75, 1–8
See application file for complete search history.

(56) References Cited

U.S. PATENT DOCUMENTS

| | | | | |
|---|---|---|---|---|
| 4,121,821 A | * | 10/1978 | Graham | 472/89 |
| 4,549,732 A | * | 10/1985 | Hoffman | 482/51 |
| 4,907,571 A | * | 3/1990 | Futakami | 601/23 |
| 4,973,044 A | | 11/1990 | Jones | |
| 5,066,000 A | * | 11/1991 | Dolan | 472/92 |
| 5,213,333 A | * | 5/1993 | Petrovich et al. | 273/243 |
| 5,232,154 A | | 8/1993 | Jenkins et al. | |
| 5,800,272 A | | 9/1998 | Pons | |
| 5,924,960 A | | 7/1999 | Cohen | |
| 7,115,071 B1 | * | 10/2006 | Sunbeck | 482/8 |
| 2002/0052220 A1 | * | 5/2002 | Tsukada et al. | 455/566 |

OTHER PUBLICATIONS

Sunbeck, Deborah T., Infinity Walk: Preparing Your Mind to Learn, 1991, Infinity Press, Rochester, New York.
Sunbeck, Deborah T., Infinity Walk: Preparing Your Mind to Learn, 1996, Jalmar Press, Torrance, California.

* cited by examiner

*Primary Examiner*—Lori Baker
(74) *Attorney, Agent, or Firm*—James Creighton Wray; Meera P. Narasimhan

(57) ABSTRACT

An apparatus for cognitive and physical training has a figure-eight walking course with both or alternate inner and outer borders. Adjustable rails inside and outside the course assist rehabilitation. Gates in outer rails admit users to the course. Oppositely swinging gates at a center of course between the two loops provide supported direction from one course loop to another. The course may include a knockdown and portable track. Coordinated walking with bodily rotation and turning is promoted by a single off course focus point in a plane through the center separating the two loops. Increased motor, sensory, cognitive and other challenges are added to the walking, turning and lateral rotation. Also disclosed is a sensory-motor game and method of playing the game, which also employs a figure-eight course.

58 Claims, 26 Drawing Sheets

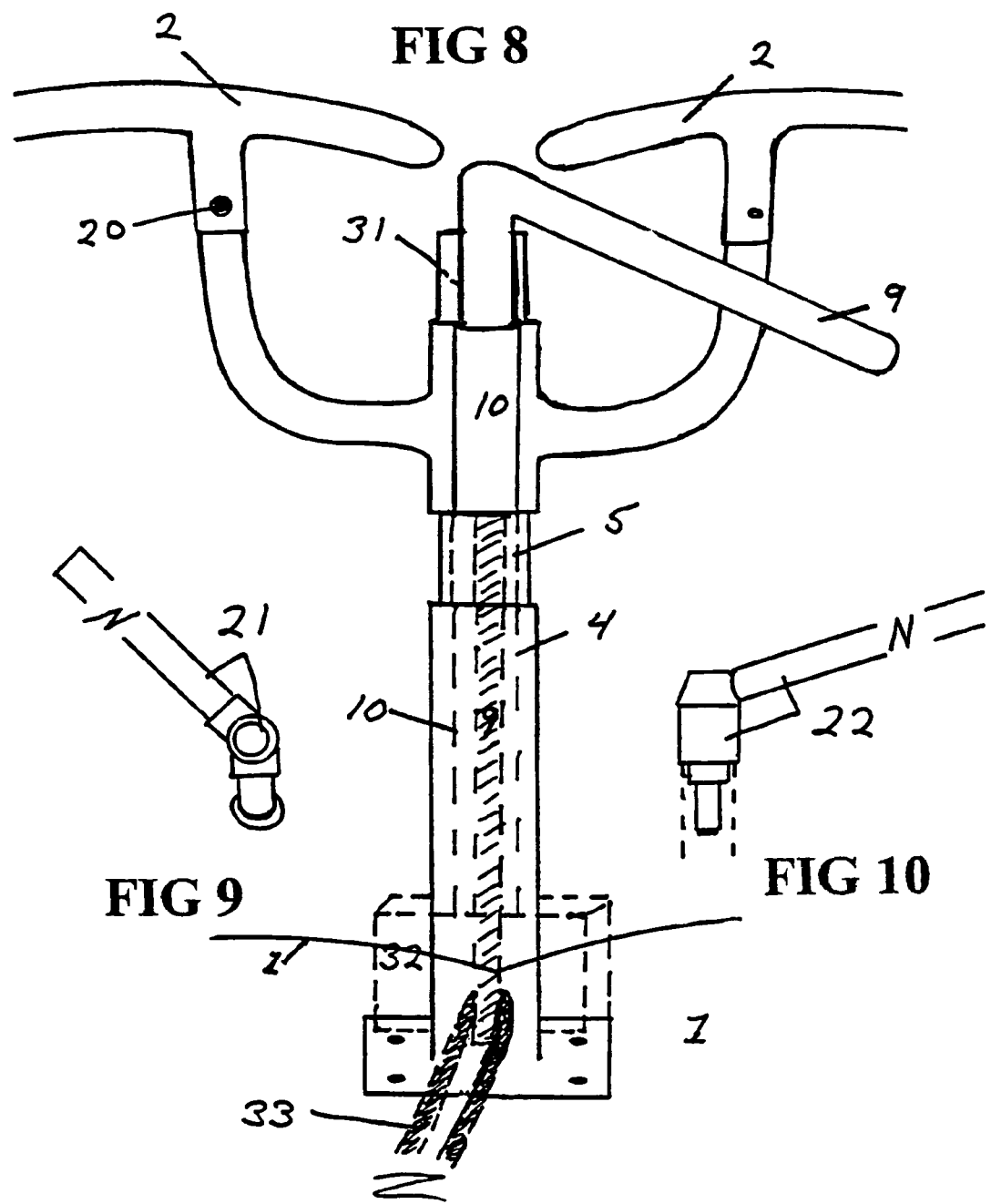

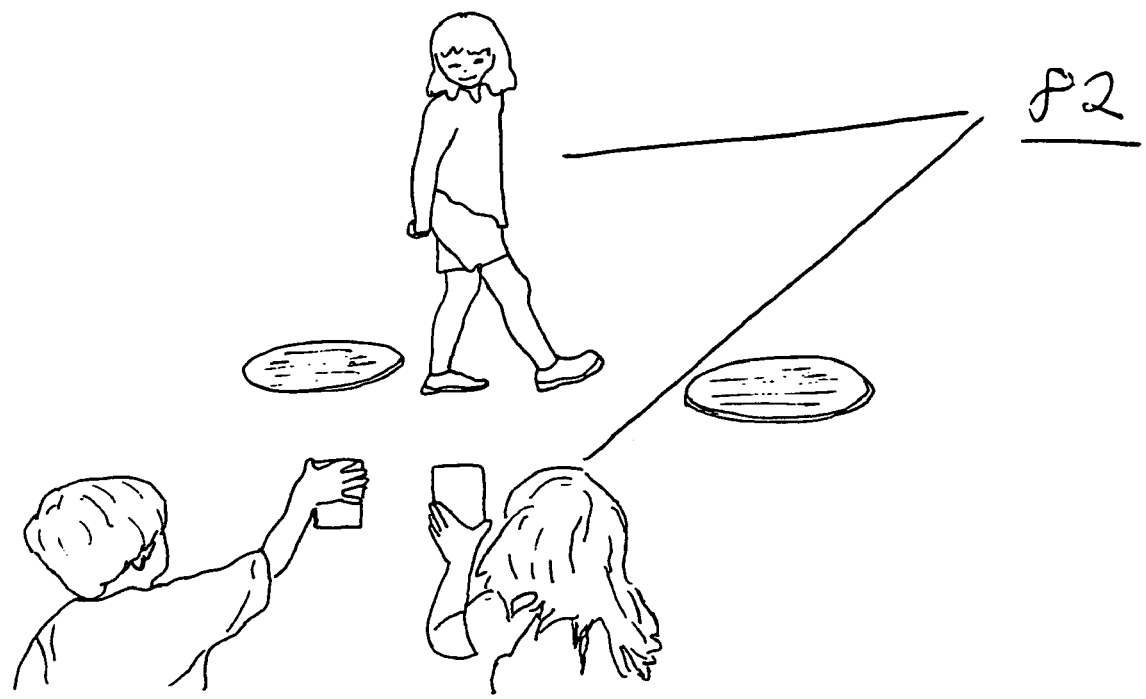
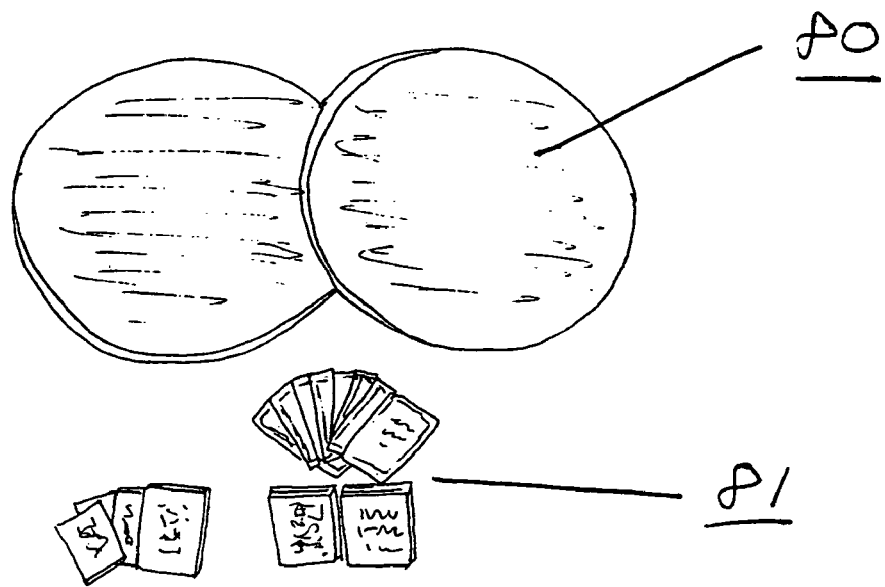
FIG 24

"FIGURE-EIGHT" TRACK, APPARATUS, METHOD, AND GAME FOR SENSORY-MOTOR EXERCISE

This application is a continuation-in-part and claims the benefit of U.S. application Ser. No. 10/223,444, filed Aug. 20, 2002, now U.S. Pat. No. 7,115,071 which is hereby incorporated by reference in its entirety.

BACKGROUND OF THE INVENTION

Many walkers and stationary parallel bars have been used to aid exercise rehabilitation for persons recovering from physical trauma including injury or stroke.

Needs exist for improved stationary guides for rehabilitation that provide greater rehabilitative integration of motor, sensory and cognitive functions.

SUMMARY OF THE INVENTION

The invention resides in the figure-eight walking course that includes a track and/or supportive rail device. Figure-eight walking had been described in publications by the inventor, but no actual course, track or guide had been created.

The basic starting method is to walk in a continuous figure-eight pattern using fixed and gated guides. The figure-eight has two mirror-imaged, generally circular or oval paths.

The method next adds any combination of motor, sensory, focused attention, perceptual, rhythmic, communication, or cognitive complexity to the figure-eight continuous walking; and, in any reasonable order. The method requires that each additional complexity should not significantly reduce the quality of pre-established competence in previous complexities, beyond a reasonable practice period. Thus, the method builds on past successes in the use of the body, in incremental steps that are broken down in complexity, so as to promote frequent successes and advancement to new levels and areas of personal challenge.

Each of the method's added complexities are equally challenged by walking along the guiding rails in both clockwise and counterclockwise directions and in generally circular walking paths which form the guided figure-eight course. As the challenges progress, the method uses the precise placement of visual, auditory, natural, human, and other stimuli at any point directly outward from the mid-line of the figure-eight course. The mid-line is determined by an imaginary line where two 90° angles would meet if measured from a second mid-line through the longest length of the figure-eight walking guides. This "point of sensory focus", be it near or far, works with the symmetry of the mirror-image figure-eight walking track or rails to allow for a balanced bilateral training of basic motor reflexes such as neck turning and eye tracking, torso rotation around the spine, arm swing, balanced use of body, and proper gaiting. It further challenges sustained sensory, perceptual and cognitive attention, and the practice of multi-tasking of all of the above.

The method is presented as a non-competitive but personally challenging form of play, in the spirit of a game of "How Many Things Can You Do At Once?" The method, thus, is suitable for both therapeutic and recreational purposes.

The present invention is a therapeutic, exercise and recreational "figure-eight" apparatus, which may include a track with assistive apparatus and method for ambulation and sensory-motor integration practice.

A flat continuous figure-eight track has two mirror-imaged generally circular surfaces. Optional adjustable and removable generally parallel rail supports or laterally confining structures or boundaries, are mounted to or otherwise follow the pathway of the continuous track. The rail has a plurality of sections; the use of each component piece being determined by the immediate application needs.

In every application, the most basic practice of the associated method is continuous assisted or unassisted locomotion, by some weight-bearing means, around the figure-eight walking course, track or surface. The method's initial motor and sensory value for the user is derived from the use of the walking course track's constant figure-eight curving. That causes the physical body of the user to alternate direction of lateral rotation between the clockwise and counterclockwise mirror-imaged halves. Therefore, all applications use the smallest and most circular track dimensions that are reasonable for the chosen means of locomotion. Once the user reaches success in continuous locomoting around the figure-eight course, additional physical challenges are selected, added and practiced in a self-paced manner. One of the most important of the next challenges is the holding of a precisely derived visual target throughout the continuous movement along the figure-eight configured course. That allows for the greatest bilateral rotation of, but not limited to, eye tracking, neck turning, and lateral torso rotation.

When the use of the new apparatus is for the therapeutic practice of walking, additional optional modular supports of two, three or four configured hand rails are used in conjunction with the figure-eight configured course, surface or track. The optional horizontal support bars have two inner and two outer generally circular handrails, which allow for passage between the two mirror-imaged halves of the track. The adjustable and removable horizontal support bars can accommodate adult and child use, and single or parallel bar applications. For example, therapist-assisted use may be aided by the removal of one support rail to provide better proximity of the therapist to the patent; especially in the case of stroke rehabilitation. Applications for other types of laterally confining structures provide spatial cues rather than weight-bearing support, confine or contain certain activities within the dimensions of the figure-eight surface, or define the boundaries of the course or track for the user.

When adjustable and removable rails and supports are used without a track, the rails and supports may be attached directly to a surface or to the ground. In this form, the inner supports and rails would provide borders at the inner boundaries of the figure-eight course.

The inner supports may be preexisting supports, they may be vertically adjustable and they may include optional table-tops attached thereto. The curved rails may also be a pair of vertically spaced rails provided on each support. The inner support posts may be vertically adjustable by manual means, or by a hydraulic lift mechanism.

When rails on outer support posts forming the outer boundary of at least part of the walking course or track are employed, the outer support posts may be vertically adjustable. The outer rails could be horizontally adjustable as well. The adjustment of both the supports and the outer rails is by manual means, or may be accomplished by motors.

The figure-eight course of the invention may include a platform track that may be knockdown and easily transportable. The platform track may be horizontal or have inclined portions with inclined border rails to match the inclined track portions. Optional, removable step training accessories are provided for attachment to the platform track.

The figure-eight course or track may be traversed on foot, with the use of a wheeled vehicle, on therapeutic horseback, or by any other means of weight-bearing locomotion.

Wheeled vehicles include but are not limited to: bicycles, roller skates, children's ride-on toy vehicles, motorized wheel chairs and other motorized transportation devices, and wheelchairs and baby carriages being pushed or otherwise manually operated. Locomotion on foot includes but is not limited to walking, jogging, and running and assisted therapeutic practice walking.

The invention also resides in a game for active physical participation causing exercise of the human body and successive skill building in multiple areas of human competencies, and a method of playing the game. The game includes at least two generally circular markers, which delineate the inner boundary of an imaginary figure-eight path around which one or more players traverse. The game also includes means for presenting topic instructions pertaining to skill building activities, which may be a plurality of game cards having one or more surfaces with indicia imprinted thereon, or may include multimedia means. The topic instruction and skill building activities would be selected from the group consisting of coordination, attention, focus, speaking, listening, memory, rhythm, imagination, general and specific knowledge bases.

The game is played by one or more players that traverse the imaginary figure-eight path around the circular markers upon correctly responding to the instructions and topics presented to them. A player's challenge is increased every minute that the player does not touch the markers while traversing around them and carrying out the skill determined by the means for presenting topic instruction. A player's turn ends when the player cannot carry out the instruction directed to a skill building activity, or when the player accidentally touches a marker while attempting to carry out the instruction.

These and further and other objects and features of the invention are apparent in the disclosure, which includes the above and ongoing written specification, with the claims and the drawings.

BRIEF DESCRIPTION OF THE DRAWINGS

FIG. 8 is a side view showing the double rail support base with optional swing arm.

FIG. 9 is a top view of the optional manual swing arm rotation device.

FIG. 10 is a side view showing an alternate manual swing arm rotation device.

FIG. 24 shows a figure-eight amusement game application of the present invention.

DETAILED DESCRIPTION OF THE PREFERRED EMBODIMENTS

Figure 1A:
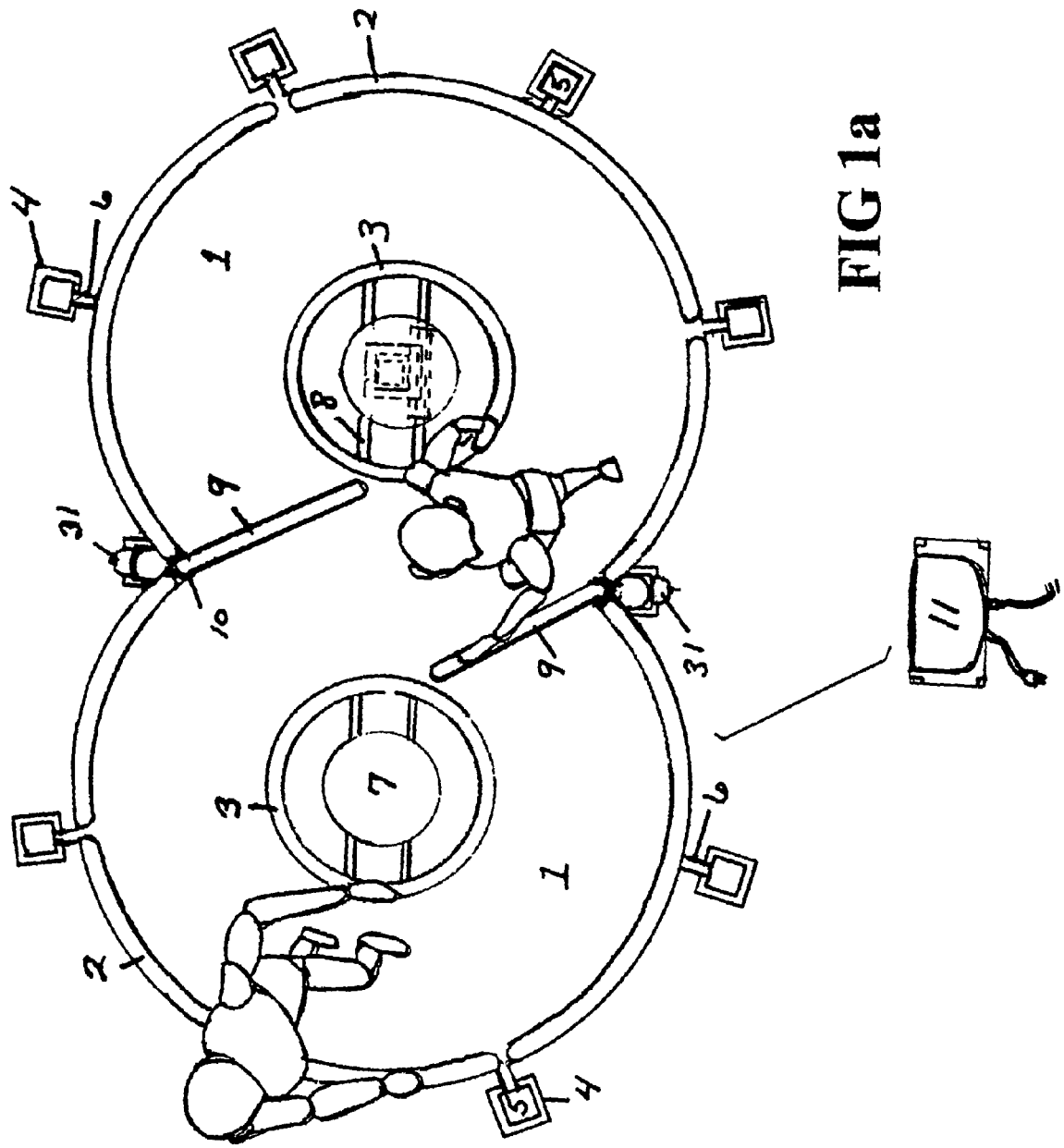
FIG. 1a is a top view showing a therapeutic and exercise ambulation application of the present invention.

FIG. 1a shows a therapeutic and exercise ambulation application of the invention, which includes assistive weight-bearing supports along outer and inner laterally defining boundaries 2, 3 of the generally figure-eight configured track 1. The track or surface is a continuous figure-eight pathway configured as two mirror-image generally circular halves.

Figure 1B:
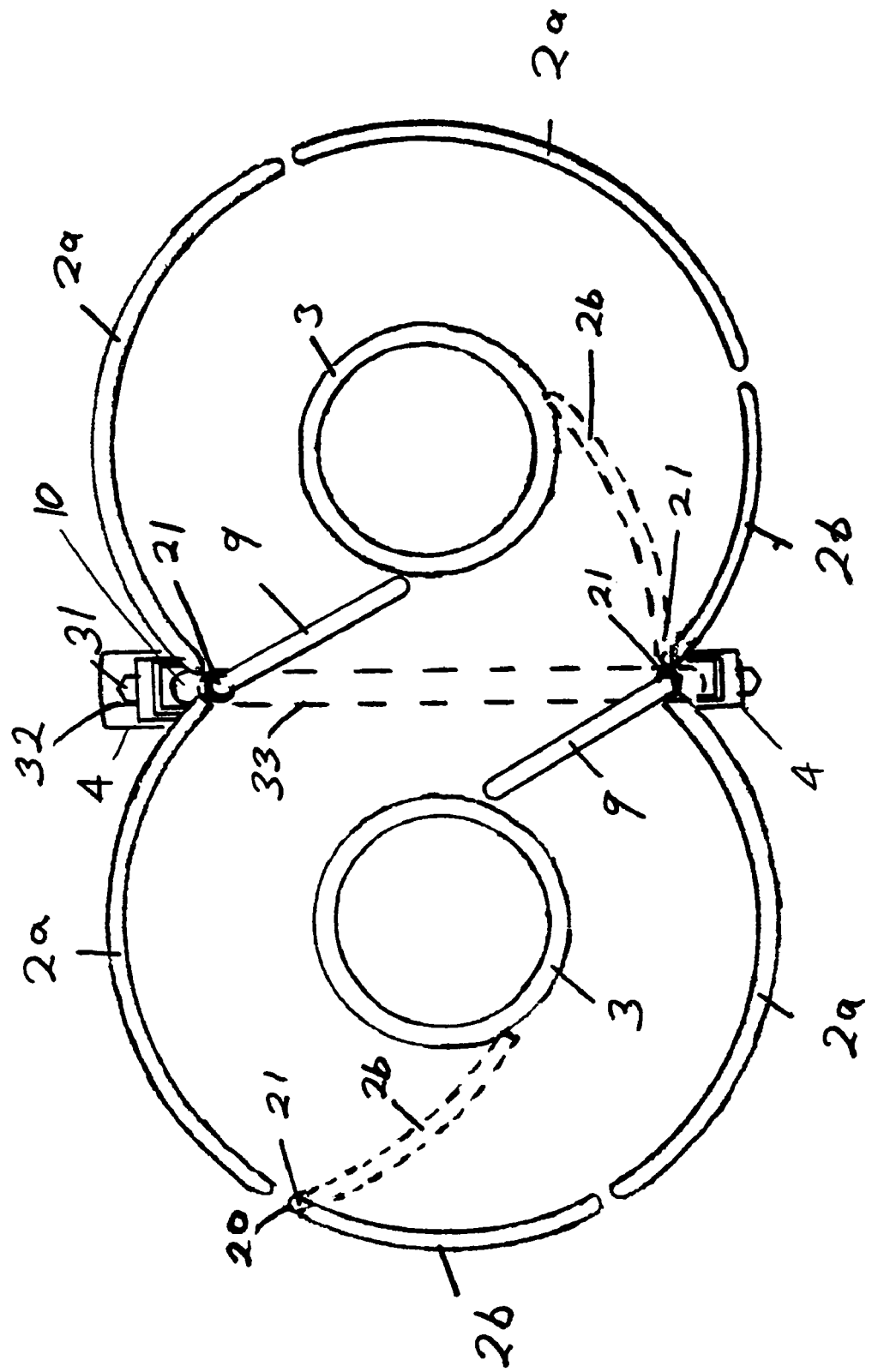
FIG. 1b is the top view shown in FIG. 1a, detailing two options for outer rail gate locations.

FIG. 1a shows an outer generally circular weight-bearing support rail 2, as it would be used for assistive ambulation applications. The track can have a variety of suitable laterally confining structures or boundaries. The outer support bars 2 include sections of hinged or removable rail, which allow entrance and exit to and from the enclosed track. The hinged or removable sections are located at any point around the circuitous outer rail. The outer rails 2, when configured to enclose the entire figure-eight track, have four longer rail sections 2a of equal length (FIG. 1b). Two shorter hinged or removable gate rail sections 2b can be located anywhere along the outer rail structure 2, so as to provide the most convenient entrance and exit locations when in use.

The inner generally circular weight-bearing support rails 3 are used for assistive ambulation applications, but otherwise can be comprised of a variety of suitable laterally confining structures or boundaries. The figure-eight configured track 1 may be made of materials such as, but not limited to, resilient flooring or a rubberized surface. The assistive support devices 2, 3 may be used separately and secured directly to the available flooring surface.

The distance between the outer and inner generally circular weight-bearing support rails 2, 3 or otherwise laterally confining structures or boundaries will vary with application.

FIG. 1a shows an assisted ambulation application, which might be used therapeutically for, but is not limited to, rehabilitation or exercise for the disabled or the elderly. In this application the width of the walking course 1 is sufficient to allow for the generally parallel support rails 2, 3 along the inner and outer laterally confining structures to be reachable by both hands simultaneously, or requiring no more than one step to reach from one of the two inner support rails 3 to the other inner circular rail 3.

Figure 6:
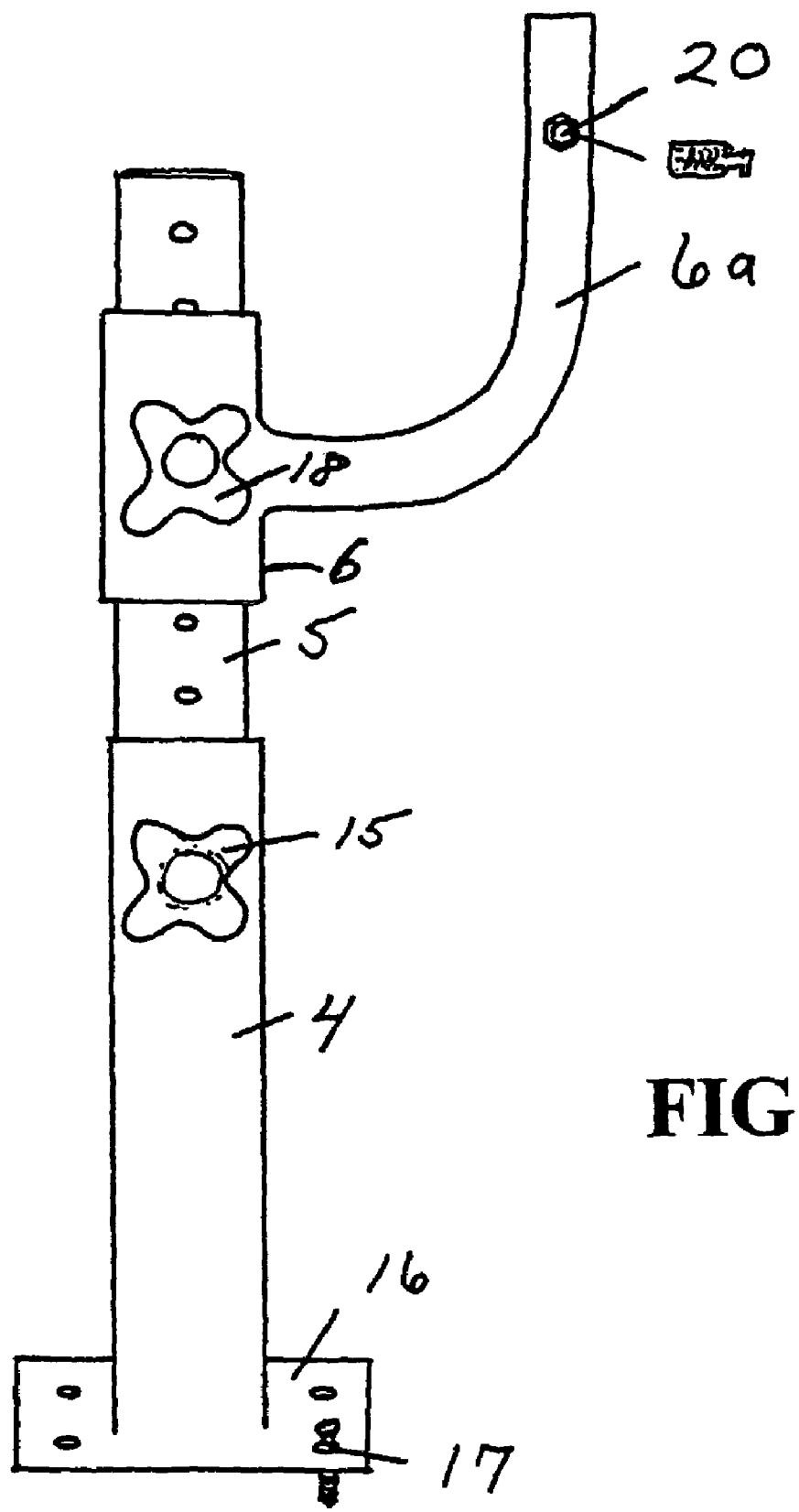
FIG. 6 is a side view showing the single rail support configuration for the outer generally circular weight-bearing support.

As shown in FIG. 6, surface mounted support columns 4 act as outer sleeves for somewhat more narrow height adjustable columns 5, which slide vertically inside the surface mounted support columns 4. Upper vertically sliding collars 6 that fit over adjustable columns 5 provide second height adjustment sources for further fine-tuning of the support height to an individual user's needs. Upward curving tube extensions of the sliding collars 6 are used to secure the outer generally curving weight-bearing support rails 2 to the vertical sliding collars 6.

Figure 3:
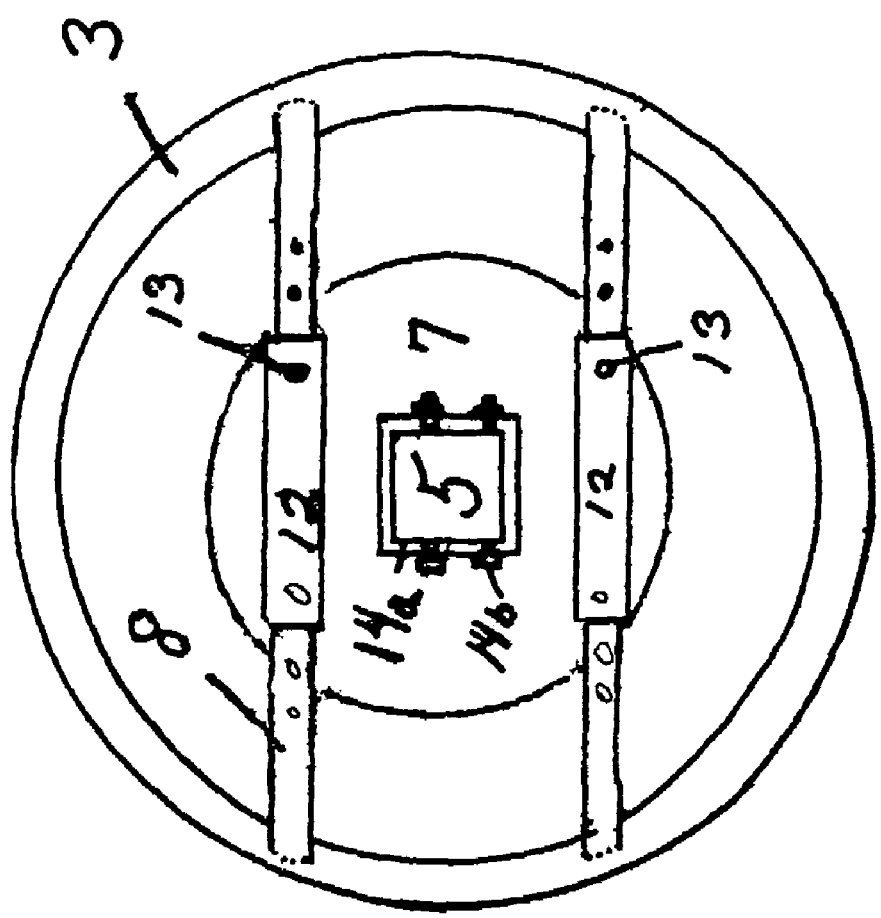
FIG. 3 is a bottom view of the inner circular weight-bearing support rail.
Figure 4:
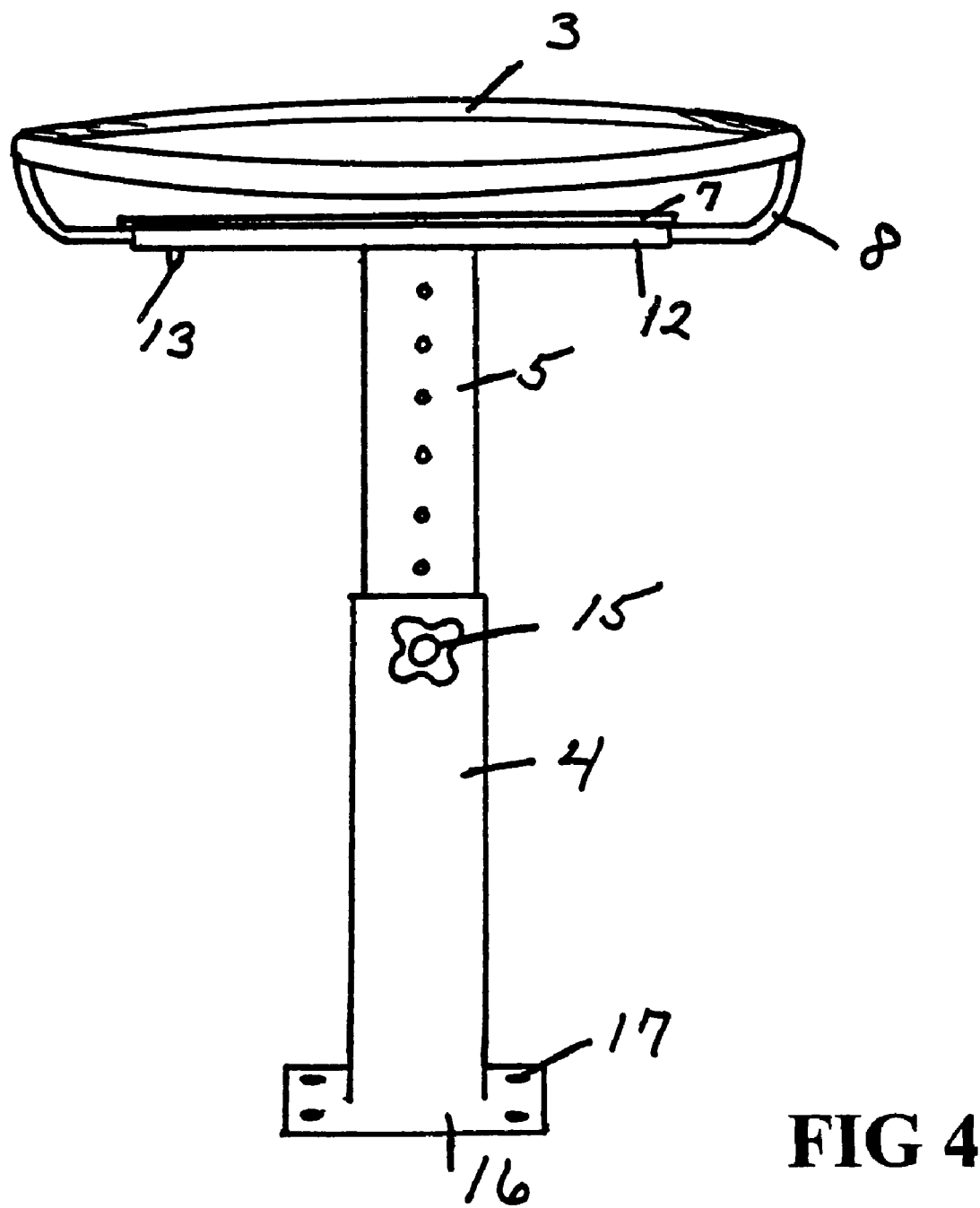
FIG. 4 is a side view of the inner generally circular weight-bearing support and the adjustable height column.

As shown in FIGS. 3 and 4, the inner generally circular support rails 3 use a somewhat different support configuration. Surface-mounted support columns 4 act as outer sleeves for somewhat more narrow height adjustable columns 5, which slide vertically inside the surface mounted support columns 4. The tops of the vertical support columns 5 are fastened to the undersides of the top plates 7. Columns 5 fit into collars 14a welded to the undersides of plates 7, and the columns are secured to the collars 14a with two or more sets of bolts 14b and nuts or other type fasteners.

The vertical height adjustments to the outer and inner weight-bearing generally parallel support rails 2, 3 give stability and mobility support within a height range from cane or walker to crutch-height, with the option of using equal or unequal heights between the inner and outer support rails. Variations in the lengths of component base columns 4 and adjustable support columns 5 used during fabrication provide for a full range of height applications from very early childhood needs to the tallest of adult height applications.

Width adjustable horizontally mounted supports 8 attach to the inner weight-bearing generally circular support bars 3, so as to give stability and mobility support to the invalid user. That allows for either simultaneous or one-step-away use of both of the inner support rails 3. Optional width-adjustable vertically sliding collars 6 attached to the outer rails 2 provide further range of track width. Variations in the overall dimensions of the components, including but not limited to the dimension of the track surface, the rails lengths and diameters, during fabrication provide for a full range of applications from very early childhood needs to the tallest of adult height applications.

An optional and quickly removable identical pair of swinging weight-bearing supports 9 rotate inside a vertical column 10 that is attached to the inner lateral plane of the two center support columns. The lengths of the swinging supports 9 create arcs that allows the invalid user to continue along the entire continuous track without interruption of bilateral weight-bearing support. The arcing rotation of the swinging supports 9 is accomplished through either manual devices 21 or 22, or a reversible motor driven belt apparatus 32. The motorized belt 33 fits under a slightly raised figure-eight track and engages both swing arms 9 simultaneously (FIG. 1b) thereby opening and shutting the two swinging supports 9 in unison through the use of a switch 31 installed on both center support columns that hold the swinging rail extensions 9. The swinging rail extensions 9 are easily removed by the therapist as soon as rehabilitation progresses to a point where rail releasing and hand reaching by the user while stepping out is safe for the user and it is of additional therapeutic value to do so. Removal is accomplished by lifting the swinging bar extension 9 directly up and out of the vertical housings 10.

FIG. 1b shows two options for outer rail 2 gate 2b locations and the option for an inward swinging gate 2b controlled by an adjustable locking hub 21 with rotary bearing that provides positive locking at 10° increments of swing. A simpler means to entering and exiting through the gate without need for a control mechanism is to release spring-loaded locking pins 20 (FIGS. 6 and 8) and lift the gate 2b up and off the vertical support collars 6. The gate also can be lifted up and off in this same manner with the use of the locking hub option 21. As the user progresses in ambulation, and in applications that do not require containment of the user, the gate may be removed from the outer rail configuration, so as to leave an open passage into and out of the figure-eight track.

FIG. 1b shows the two optional swinging supports 9 controlled by a manual adjustable locking hub 21 with rotary bearing that provides positive locking at 10° increments of swing. FIG. 1b also shows a motorized option for controlling the rotation of the swinging rail supports 9. A reversible motor 32 drives belt 33 in therapeutic applications when the user is more dependent on the parallel rails. The motor driven belt 33 is housed under a slightly raised track with tapered edges, so as to engage downward extending columns of the swing bars 9 and rotate these downward extending columns in either clockwise or counterclockwise directions inside the vertical housings 10 welded to the support base 4, rather than to the upper adjustable collar 6, as is done in manual applications of the swing arm 9. The motorized device is controlled by switches 31 placed on motor 32 or on the two center support posts 5. The switches 31 may be placed on support posts 5 other than the center support columns 5 to allow the user to activate the gates 9 before reaching them. The wiring to connect the switches 31 to the motor 32 is placed under the slightly raised track to allow for any user-required location of the switches 31.

The reversible motor belt-driven device is capable of simultaneously swinging the two rotating arms 9 clockwise and counterclockwise by belt 33.

The related method trains the user to progress towards walking the continuous figure-eight path while attempting to look towards a specifically calculated "point of sensory focus". The point for visual and auditory focus is represented in FIG. 1a as a television 11, but it could be any natural, object, electronic or human stimulus. The method of locomotion around the symmetrically configured figure-eight course equally trains the lateral halves of the user's body. The method further trains bilateral motor reflexes such as neck turning and eye tracking, full range of torso rotation, and visual and auditory sensory attention towards the designated point of sensory focus, and more. The method further integrates motor skill building with sensory attention development, and establishes a basic sensory-motor skill foundation for adding other multi-tasking skills to the method, such as, but not limited to, gaiting, communication (listening and speaking), and cognitive skills. The user practices various multi-tasking skills while maintaining or improving coordinated locomotion around the continuous course. As the user's skill level progresses, new skills are added to the previously successful multi-tasking, while continuing to move around the generally figure-eight course and holding attention on or towards the point in space represented by the television 11 in FIG. 1a and the person 34 on a park bench 35 in FIG. 14. The sensory stimulus may be placed anywhere along a near to far linear plane, or an up or down linear plane, but must be located directly outwardly from the midline of the figure-eight configuration, so as to be viewed at any point on a line that might cut the mirror-imaged figure-eight track into two identical circular halves. One illustration of an example of a properly placed point of sensory focus is the location of the park bench 35 seen in FIG. 14.

The minimum usage of the method requires that some form of ambulation or locomotion occurs continuously for some length of time that is therapeutic, recreational, or otherwise beneficial to the user and that the activity is carried out in such a manner as to follow along a track or surface that is configured as a flat figure-eight surface with mirror-imaged halves, so as to provide the user with bilaterally symmetrical usage of both lateral halves of the body. The method further provides the user with increased bilaterally symmetrical usage of both lateral halves of the body by adding a sensory focal point that is exact in its placement so as to maximize bilateral rotation of the entire body, including, but not limited to eye tracking, neck and ear turning, and torso rotation.

The method is best carried out through the mirror-imaged clockwise and counterclockwise circling of the continuous figure-eight configuration, and therefore uses the smallest and most circular flat surface areas that are reasonable for each application. For ambulation by foot the smallest reasonable track would allow the most physically fit of users to complete one entire figure-eight circuit in no less than thirteen steps. This limitation to size prevents over rotation of the knee joints during continuous circling. The upper limits of the figure-eight course is determined by usage, with biking applications, as one example, requiring a larger course than walking applications. For all applications, the benefits of the method are greater when lateral rotation of the head or body is oriented towards the designated point 11 of sensory focus. Therefore, even in larger area outdoor applications of the invention, the figure-eight track configuration is not unreasonably elongated so to cause too much time spent in linear locomotion; nor is the figure-eight configuration necessarily comprised of overly round circular paths, since the increase in roundness in larger area use forces an over rotation of the entire body to hold the user's vision on the designated sensory stimuli 11. In general, the larger the figure-eight configuration, the less round and the more laterally oval the clockwise and counterclockwise halves of the figure-eight configured course, track or surface will be, without becoming so elongated as to not be useful within the purpose of the method.

Figure 2:
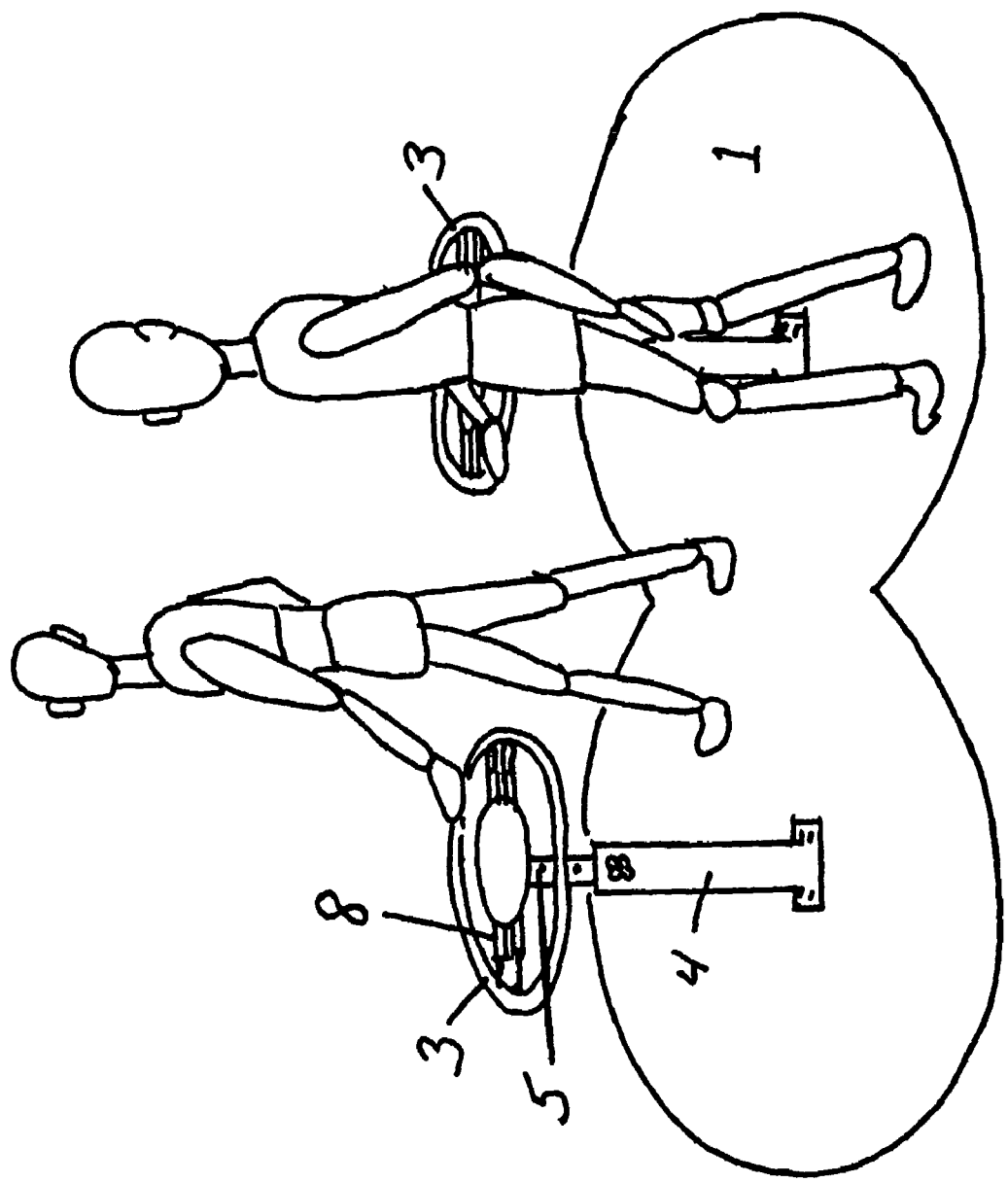
FIG. 2 is a side view of the invention using a continuous track with two inner generally circular weight-bearing support rails.

FIG. 2 shows an application of the invention that uses the continuous track 1 with just the two inner generally circular weight-bearing support rails 3. Other laterally confining or supportive structures could be used. FIG. 2 shows an assisted ambulation application which might be used therapeutically for purposes such as, but not limited to, rehabilitation or exercise for the disabled, the convalescing, or the generally weakened aging user who might benefit from continuous light touch support and periodic weight-bearing support for either lateral side of the body. In this application, the width of the walking course, especially as it passes through center of the figure-eight configuration, is such as to allow the user to engage the second generally circular support rail 3 within one or two steps of releasing the first one. The application of the invention shown in FIG. 2 is for users who do not require the simultaneous bilateral support of parallel bars, and can benefit from alternately left and right sided light touch or weight-bearing support, which occurs as the ambulation shifts between a clockwise and counterclockwise direction while locomoting along the entire figure-eight course.

FIG. 3 shows the underside of the inner circular weight-bearing support rail 3 and its attachment to width-adjustable laterally sliding channel bars 8. The sliding bars 8 move laterally through two somewhat larger channel bars 12. The sliding bars 8 are secured in the channel bars 12 by hand-retractable spring-loaded plungers 13. A number of other types of fasteners with quick release could also be used. The two larger channel bars 12, through which the smaller channel bars 8 slide, are attached to a top plate 7 by welding or other durable attachment of one to the other. The top of the vertical support post 5 is fastened to the underside of the top plate 7 by bolts and nuts 14*b* that secure column 5 to a collar 14*a* welded to the underside of plate 7. Other forms of attachment are possible.

FIG. 4 shows a lateral view of the inner generally circular weight-bearing support 3 and the adjustable height column 5, which slides inside a somewhat larger vertical column 4 and is secured in place by a clamping knob 15 or some other means of secure fastening. The entire vertical support column is mounted on a floor plate 16, which is fastened to the figure-eight surface or track with four or more bolts 17 or other removable fasteners.

Figure 5:
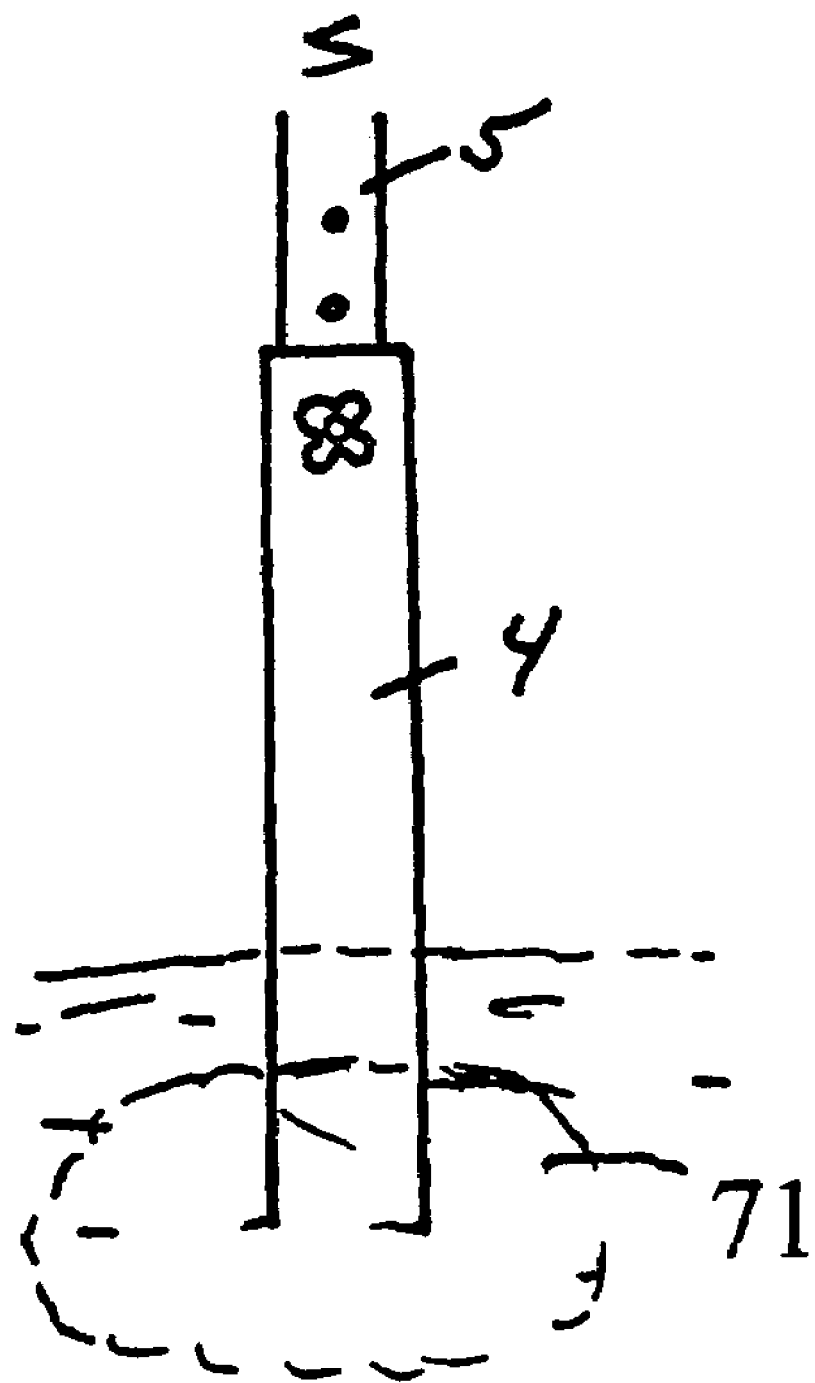
FIG. 5 is a side view of an outdoor installation option to secure the larger vertical base column.

FIG. 5 shows an outdoor installation option to secure the larger vertical base column 4 directly into the ground by means of digging a hole and setting the vertical base 4 in concrete 71. The inner vertical sliding column 5 and attached upper apparatus can be detached seasonally or stored as needed.

FIG. 6 shows the single rail support configuration for the outer generally circular weight-bearing support 2. An upper vertically sliding sleeve 6 provides a second height adjustment source for further fine-tuning of the support height to an individual user's needs. A clamping knob 18 secures the vertical sleeve in place on the sliding column 5.

An upward curving bar 6*a* extending from the sliding sleeve 6 secures the outer generally curving weight-bearing supports 2 to the vertical sliding sleeve 6 by means of bolts and wing nuts 19 or other form of removable fastener placed through aligned holes drilled through the entire width of bars 6*a* and 6*b*, so the downward extensions 73 of outer rails 2 to mount them on the vertically sliding sleeves 6*a* and 6*b*. Spring loaded locking pins permanently installed inside the tubing of the downward extensions 73 directly in line with the holes 20 in the upper curving bars of 6*a* and 6*b* may also be used to secure the outer rails 2 to the support column vertically sliding sleeves 6, while providing quick release. The single rail supports are used for additional support at the midpoint of the longer outer rail sections 2*a*.

Figure 7:
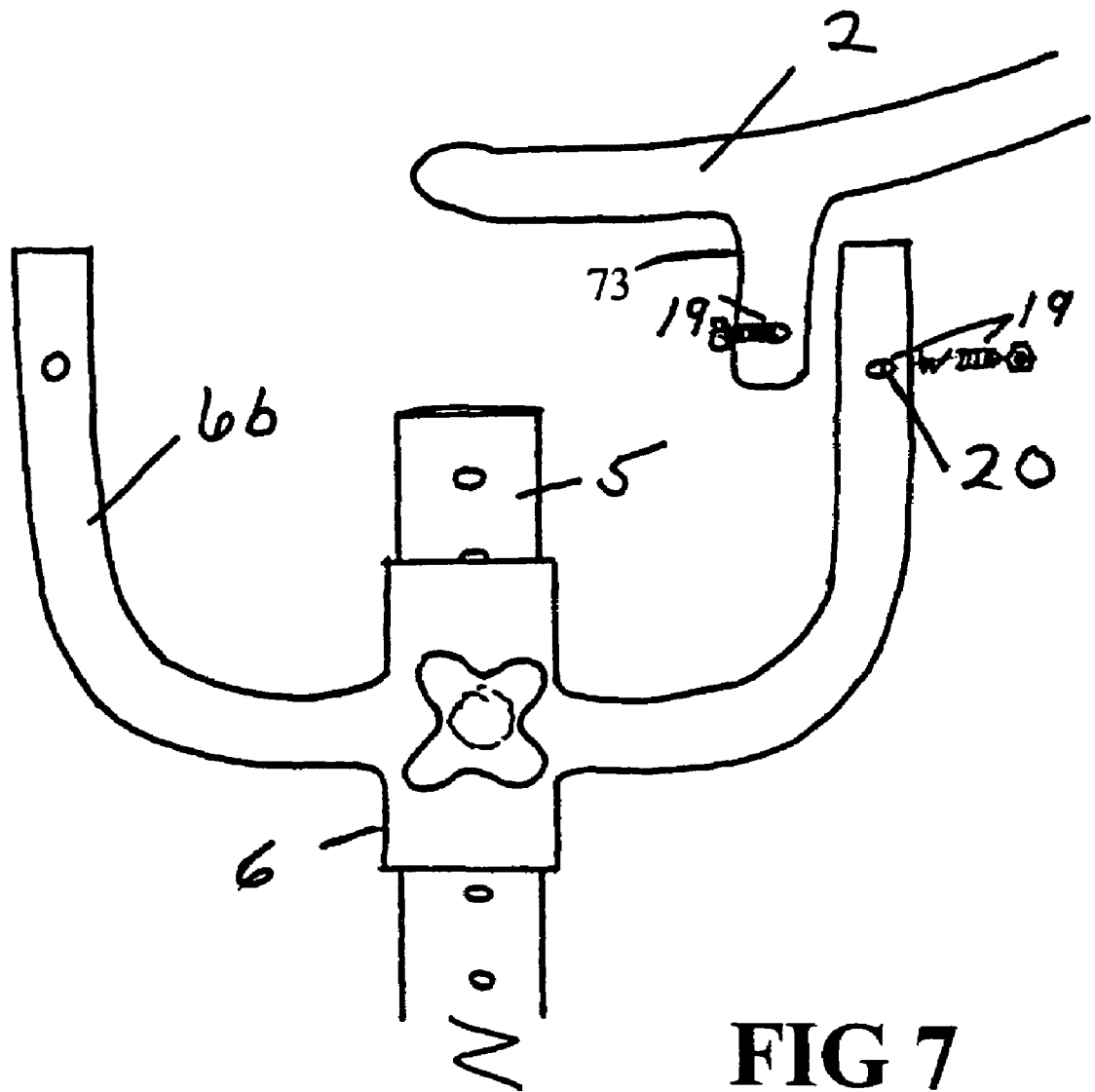
FIG. 7 is a side view showing the double rail support base configuration for the outer weight-bearing support.

FIG. 7 shows the double rail 6*b* support base configuration for the outer weight-bearing support rails 2, which is used when two outer rails meet. The double rail support configuration also takes advantage of a choice of fasteners including, but not limited to, bolts and nuts 19 or spring loaded locking pins. The double rail support configuration is always involved when the rail being secured is a gate rail. In the gate configuration, one upper extension of the vertically adjustable collar is adapted to hold the hardware for an adjustable locking hub with rotary bearing that provides positive gate locking at 10 degree increments of swing (FIGS. 8-9).

FIG. 8 shows the double rail support base with optional swing arm 9 used for the two midpoint support bases which mark the midpoint between the two circular halves of the figure-eight configured rail support. A sleeve 10 laterally welded and attached to the vertically sliding sleeve 6 holds the mechanisms for rotation control devices 21, 22, or 32. Other rotating devices may also be used. In particular, the vertical sleeve 10 is configured to accept hardware for optional manual or motorized swing of the rail extensions swing arms 9.

FIG. 9 shows a top view of one possible manual swing arm 9 rotation device. An adjustable locking hub 21 with a rotary bearing provides positive locking at 10 degree increments of swing.

FIG. 10 shows an alternate manual swing arm 9 rotation device that uses a safety tension lever 22, which engages and locks with downward pressure on the top or on arm 9, but is otherwise free to swing arm 9 when released.

Figure 11:
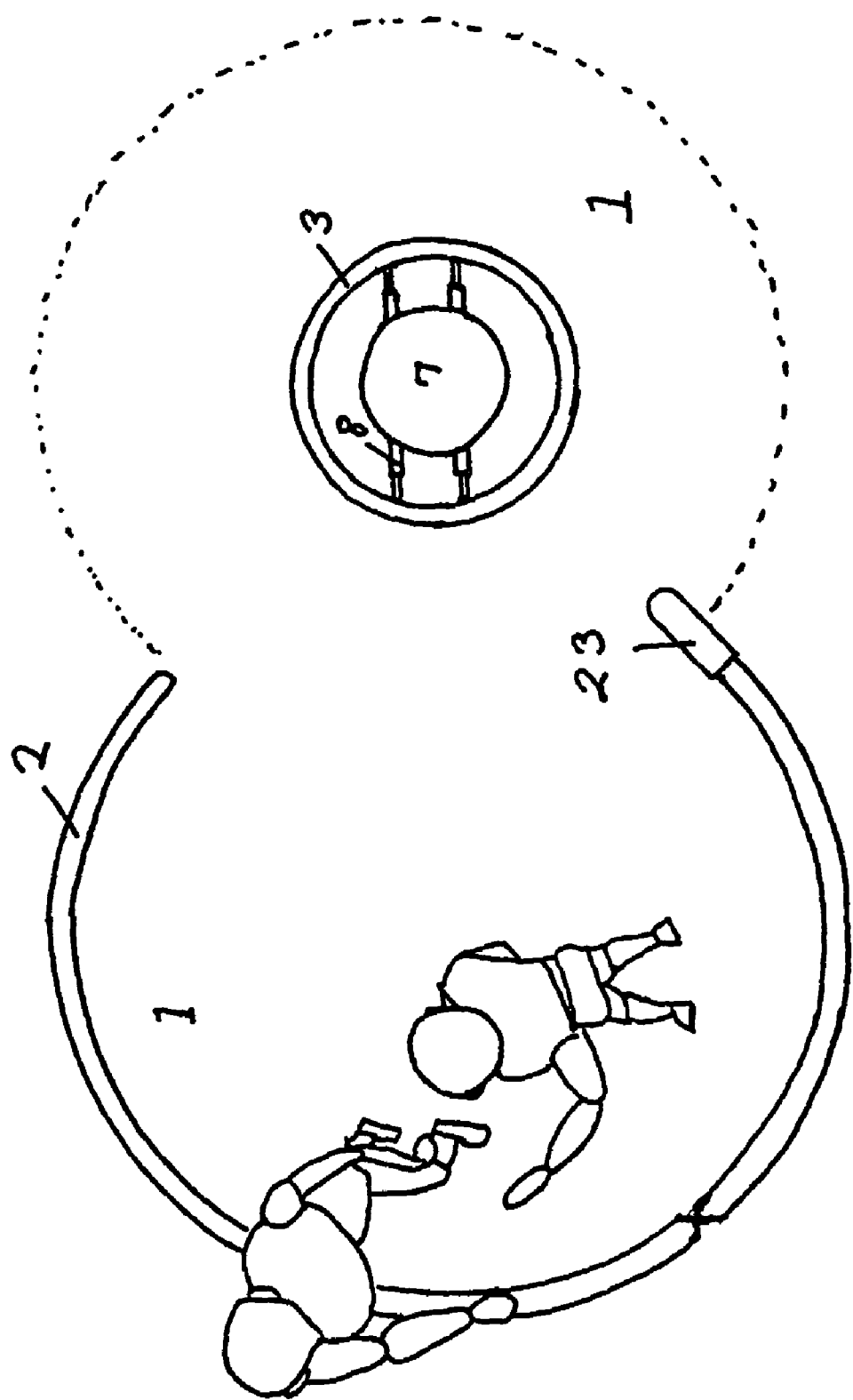
FIG. 11 is a top view of the therapeutic and exercise ambulation application as shown in FIG. 1, detailing a special needs application of the present invention.

FIG. 11 shows a special needs application of the invention where use of one outer rail 2 and one inner rail 3 weight-bearing circular supports are used. The configuration might be preferred in cases such as stroke rehabilitation, or where a therapist might prefer more open walking space to directly assist the user. In configurations where just one outer support rail is being used, an optional straight rail extension 23 may be used instead of the optional swing arm 9. The straight rail extension 23 would be used very early in therapeutic ambulation practice, when the user may still experience balance and stability insecurity or has not yet increased gait stride to allow for a normal reach between an outer rail 2 and an inner rail 3.

Figure 12:
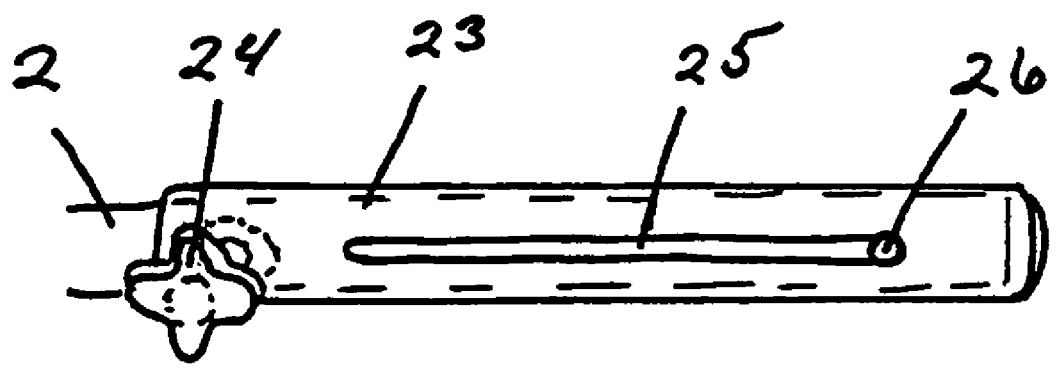
FIG. 12 is a bottom view of the optional support rail extension.

FIG. 12 shows the underside of the optional support rail extension 23. A sliding sleeve 23 that is secured to an end of the outer rail 2 with a screw knob 24, and the sleeve's extension range is limited by a groove 25 in the sleeve and a set screw 26 extending from the rail 2.

Figure 13:
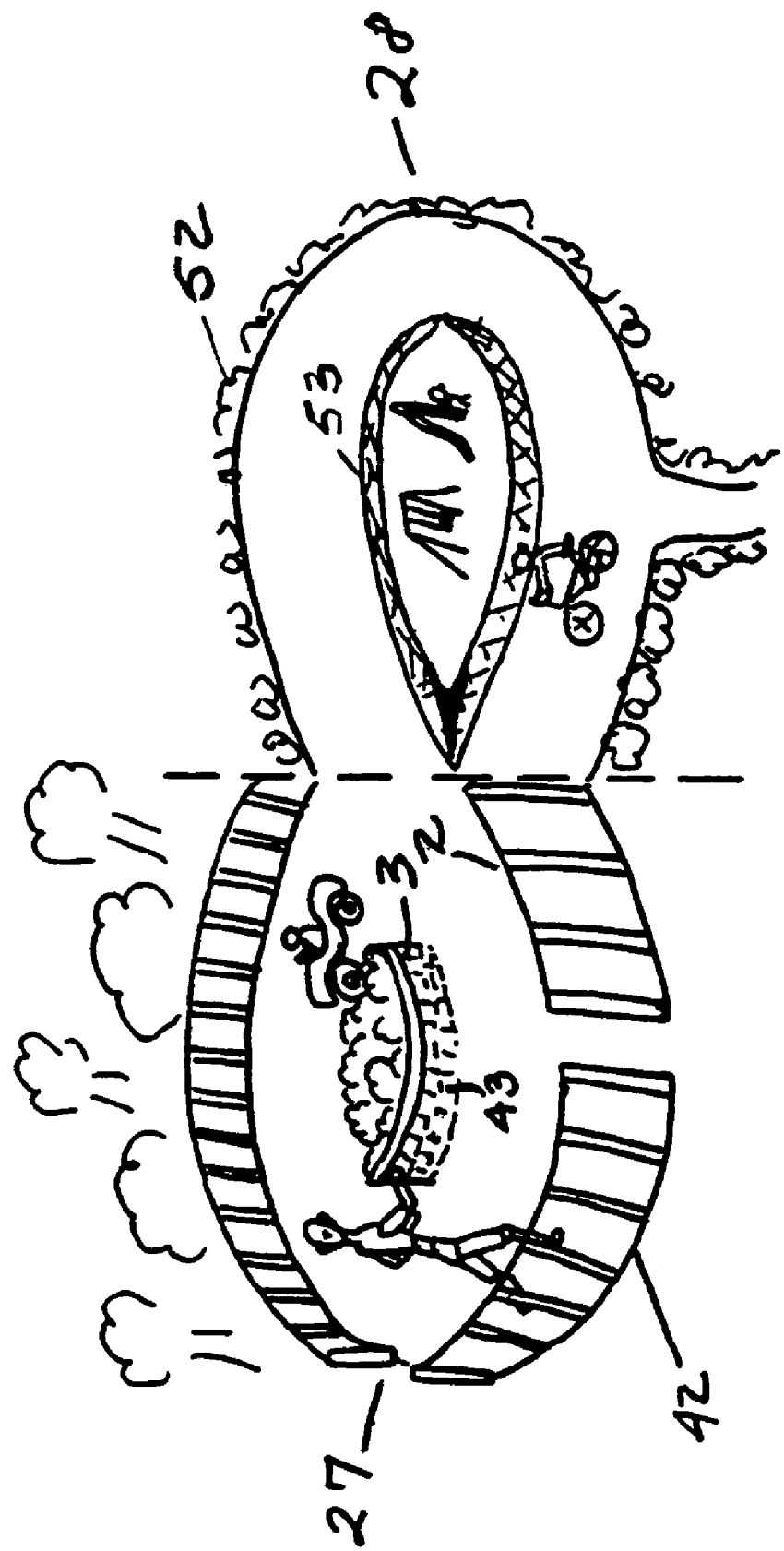
FIG. 13 is a detail showing two multi-use applications of the invention and method for indoor or outdoor use.

FIG. 13 shows two multi-use applications of the invention and methods for indoor or outdoor use that require a somewhat larger use of space and a slightly more oval configuration of the two mirror-imaged halves of the figure-eight configured surface or track. The application 27 shown on the left of the drawing makes use of weight-bearing rails 2 and 3 on laterally confining structures, 42, 43, which may be both functional in application and decorative in the environment. The application 28 shown on the right of the drawing makes use of laterally confining and defining boundaries 52, 53 without confining structures.

Figure 14:
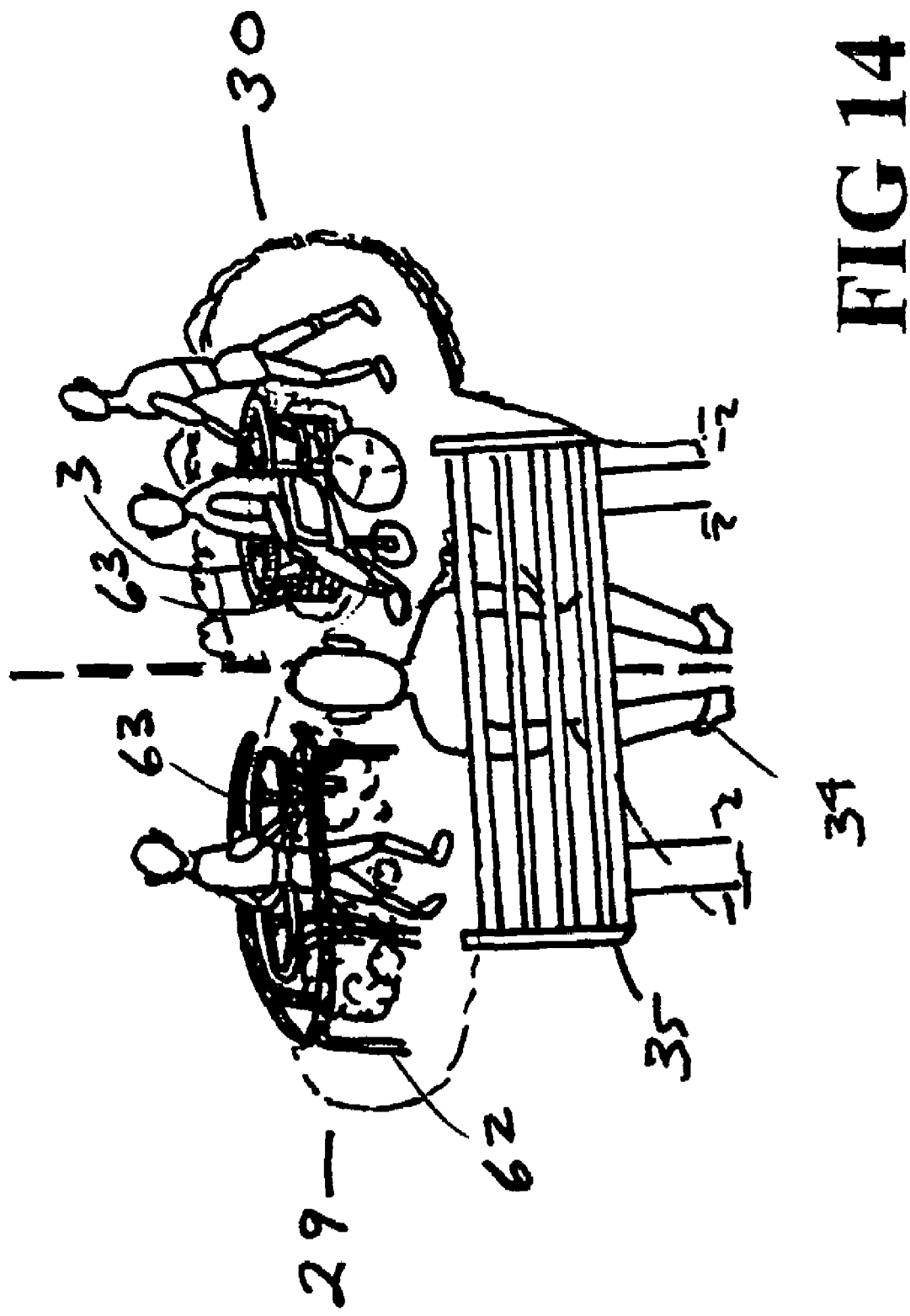
FIG. 14 is a detail showing two multi-use applications of the invention and method for indoor or outdoor use.

FIG. 14 shows two multi-use applications of the invention and methods for indoor or outdoor use that require a somewhat smaller use of space and a slightly more round configuration of the two mirror-imaged halves of the figure-eight configured surface or track. The application 29 shown on the left of the drawing makes use of generally parallel weight-bearing rails 2 and 3 on laterally confining structures 63, 63, which may be both functional in application and decorative in the environment. The application 30 shown on the right of the drawing makes use of only two inner weight-bearing rails on laterally confining structures 63, with the outer lateral boundary not including a confining structure. FIG. 14 includes an illustration of a person 34 sitting on a park bench 35 to show one configuration of the proper placement of a point of sensory focus.

Figure 15:
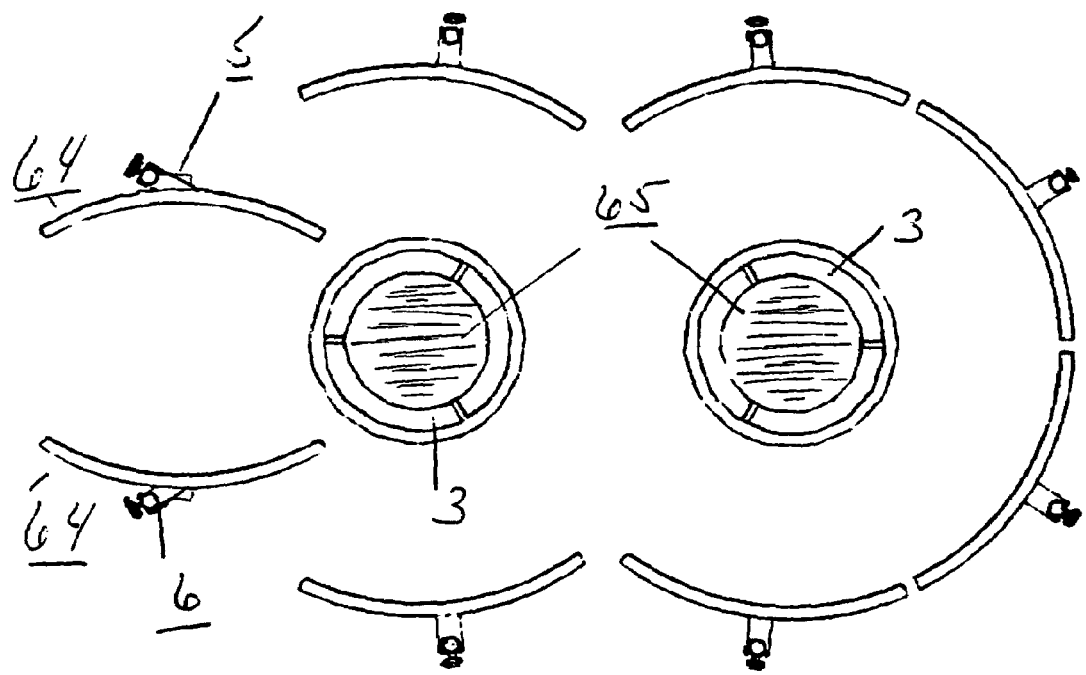
FIG. 15 is a top view showing rotating outer gate rails and optional table tops on the inner supports.

FIG. 15 shows an optional outer rail gate 64. Movable gates 64, rotatably supported on adjustable outer support columns 5, are lockable in parallel position. The moveable gates 64 may then be used as parallel rails. Also shown are optional tabletops 65 mounted on the inner support posts, which support inner circular rails 3.

Figure 16:
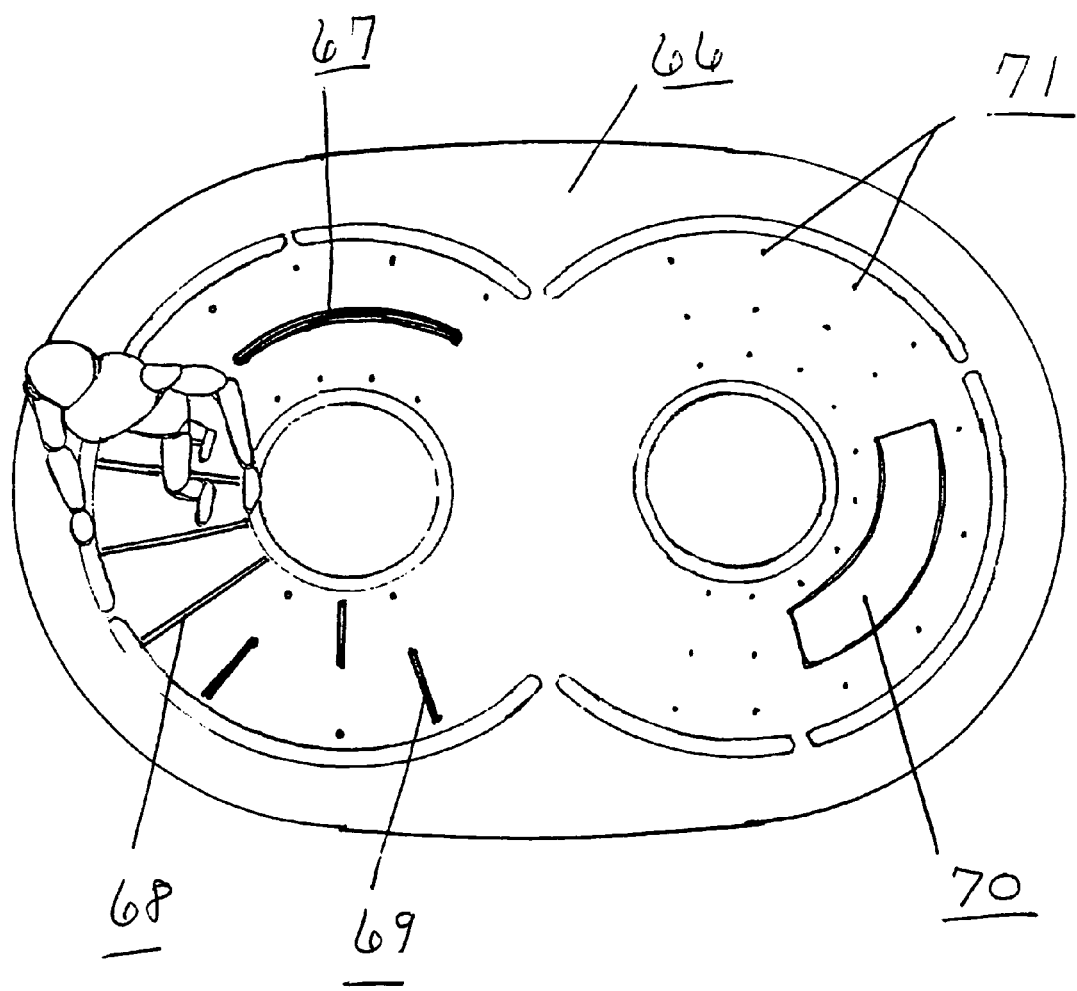
FIG. 16 is a top view showing a platform track and optional removable step training accessories.
Figure 17:
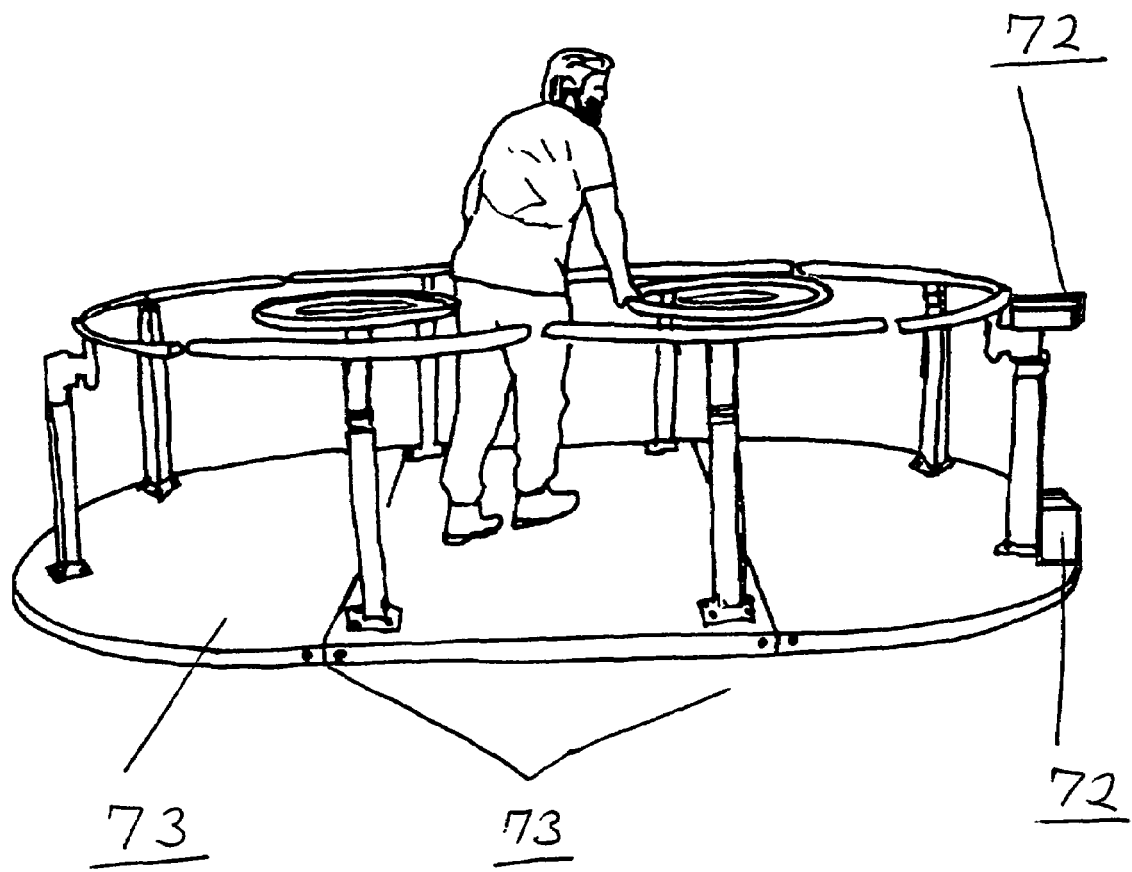
FIG. 17 is a side view showing the apparatus including an optional knockdown platform track and motorized adjustment means for the support posts and rails.
Figure 26:
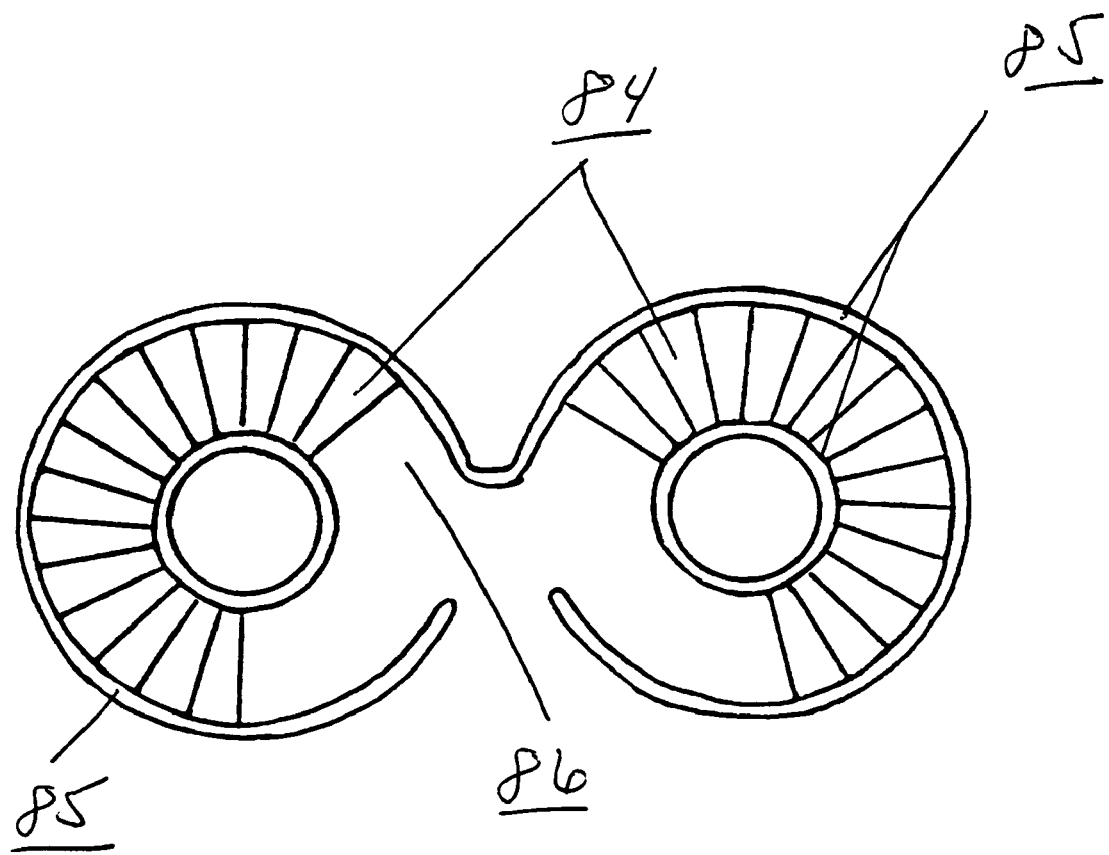
FIG. 26 is a top view of an application using optional stepping inclines and optional rail inclines.

The walking course may include a track platform 66, as shown in FIG. 16. Optional and removable step training accessories including stepping spacers 68, stepping guides 69, a center floor divider 67 that prevents a user's foot from being laterally misplaced, and a balance beam 70 may be mounted on the track platform 66. The step training accessories are mountable by doweled floor fastenings 71. A knockdown version of the platform track, as seen in FIG. 17, may be formed by a plurality of laterally connectable track sections 73 to form a complete platform track that is easily transportable. FIG. 17 shows an arrange where motors 72 are attached to the outer support posts and the outer border rails, for providing vertical and horizontal adjustment of the support posts and outer rails, respectively. FIG. 26 shows an application of an inclined track having stepping inclines 84 and optional rail inclines 85. The rail inclines 85 are arranged to match the stepping inclines 84. An alternative incline track 86, without steps, is also shown.

Figure 18:
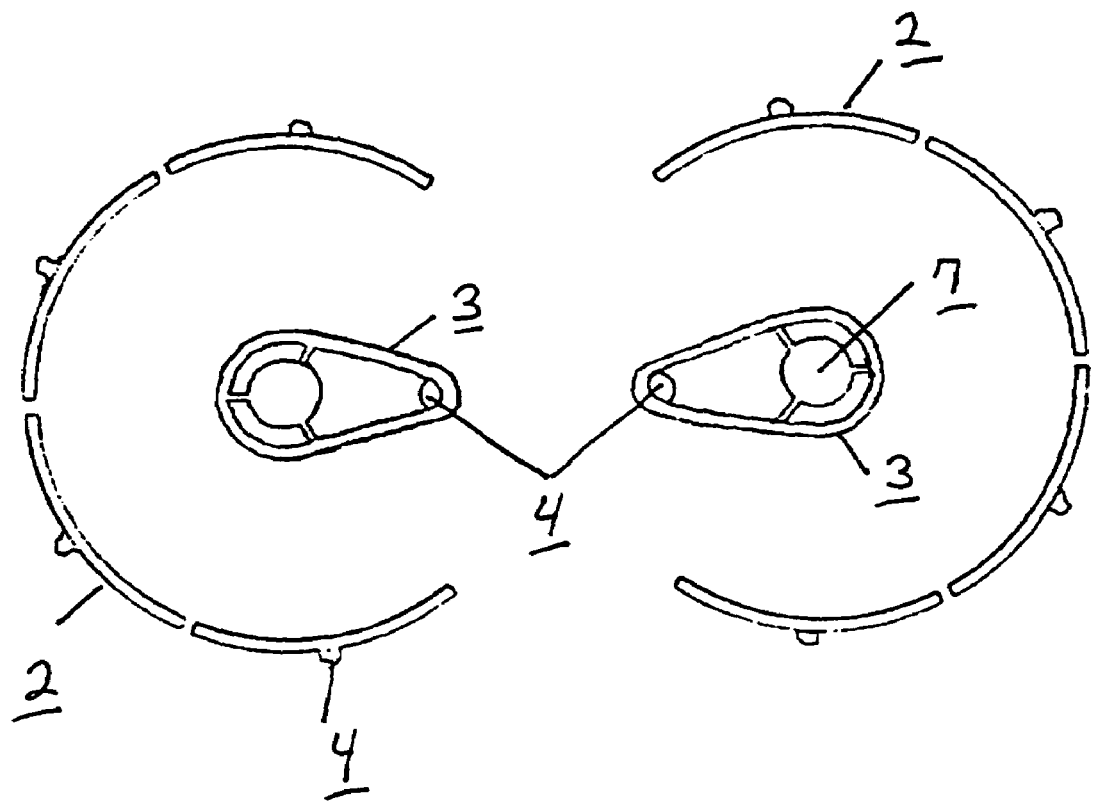
FIG. 18 is a top view showing the apparatus having an open entrance.
Figure 19:
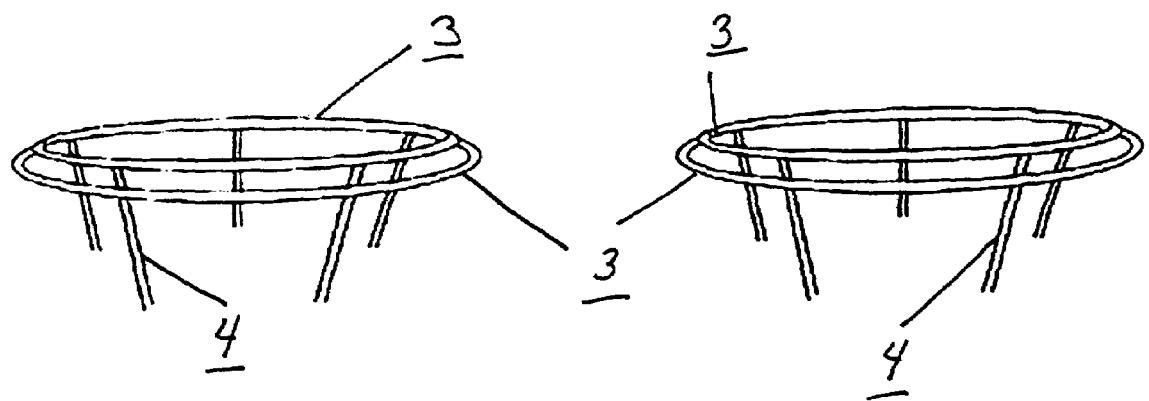
FIG. 19 is a side view showing a plurality of weight bearing supports connected to the vertically space rails.
Figure 20:
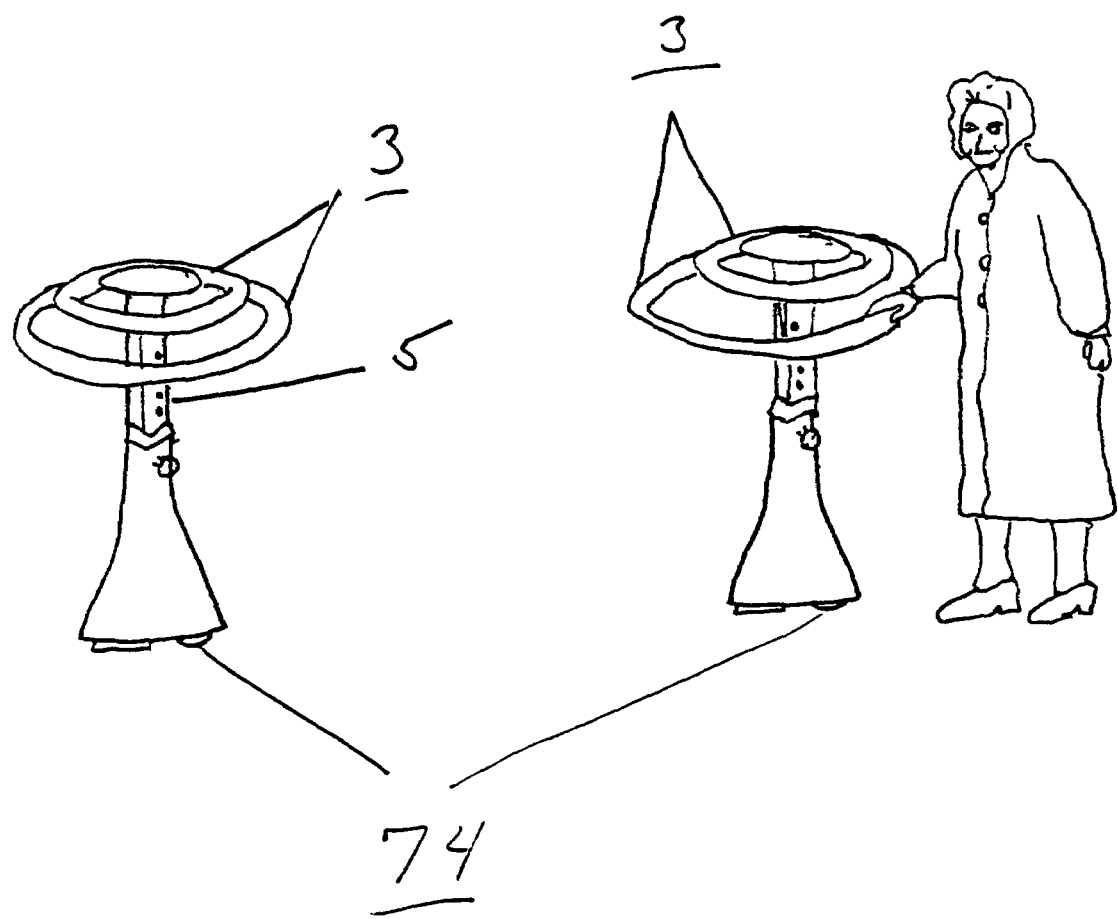
FIG. 20 is a side view showing inner support posts that are vertically adjustable and portable.

Shown in FIG. 18 is an open entrance application of the invention where there are openings provided in the outer rails 2 for entrance to the course or track. FIG. 19 shows a plurality of weight bearing supports 4, which are arranged and connected to a pair of vertically spaced curved rails 3. In a variation of FIG. 19, FIG. 20 shows portable inner posts 74 having curved rails 3 attached thereto. The portable inner posts 74 and rails are also height adjustable by height adjustable columns 5 in the portable posts 74.

Figure 21:
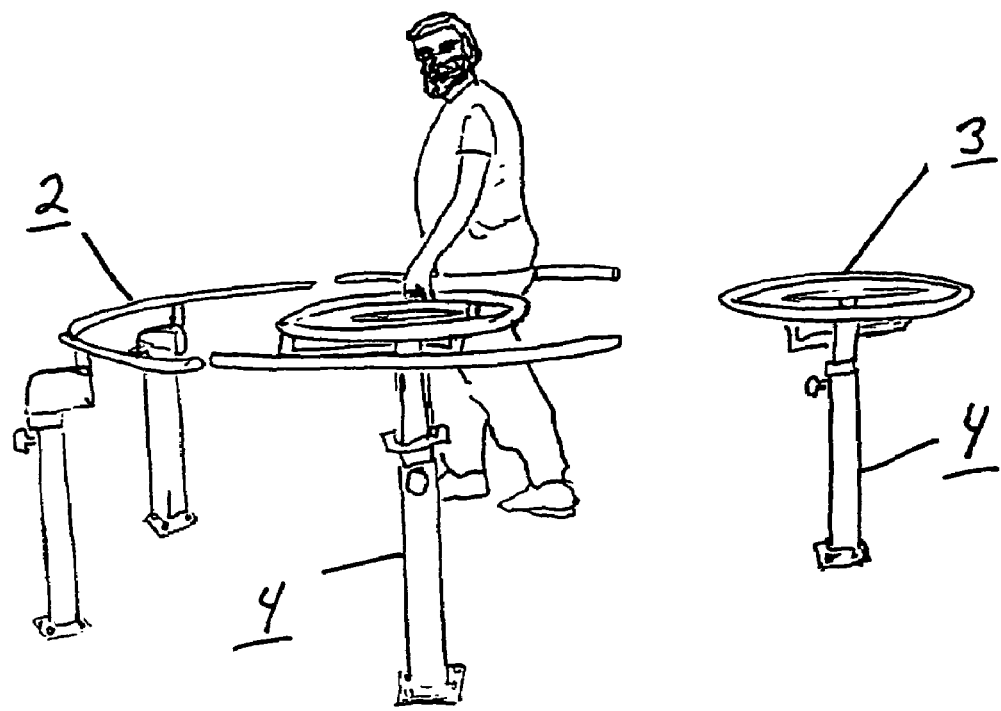
FIG. 21 is a side view showing a partly open space saver rail configuration.

FIG. 21 shows a partly open space saver rail configuration of the invention. The curved inner rails 3 and outer rails 2 are height and width adjustable. Outer rails 2 provide borders for only a portion of the figure-eight walking course of the invention.

Figure 22:
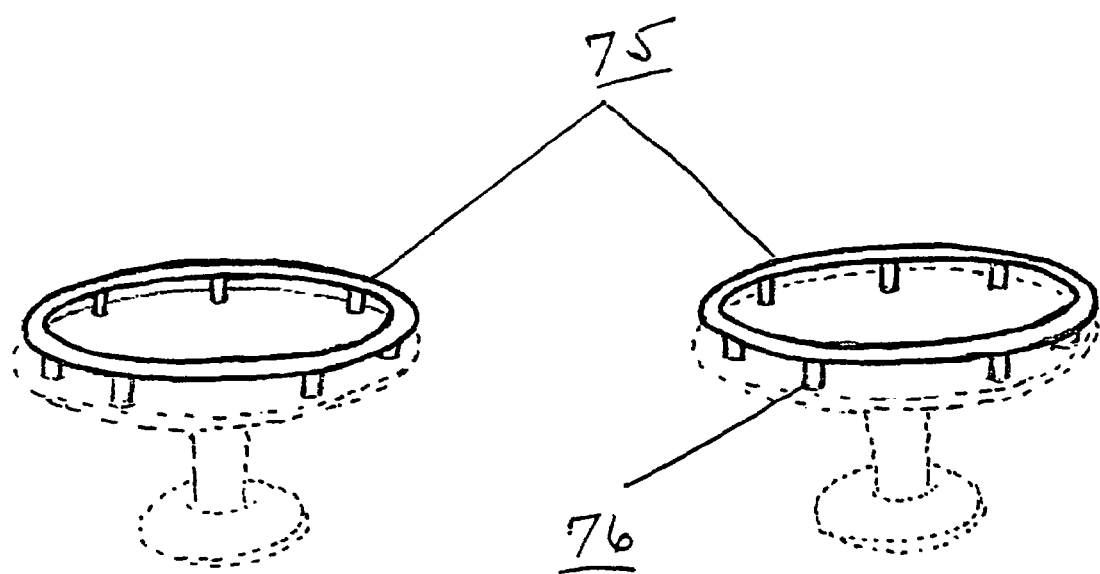
FIG. 22 is a side view showing curved rails attached to preexisting structures.

FIG. 22 shows a portable application where inner curved rails 75 are configured to be attached to preexisting structures 75. In the application shown, the curved rails 75 are attached to tabletops 74.

Figure 23:
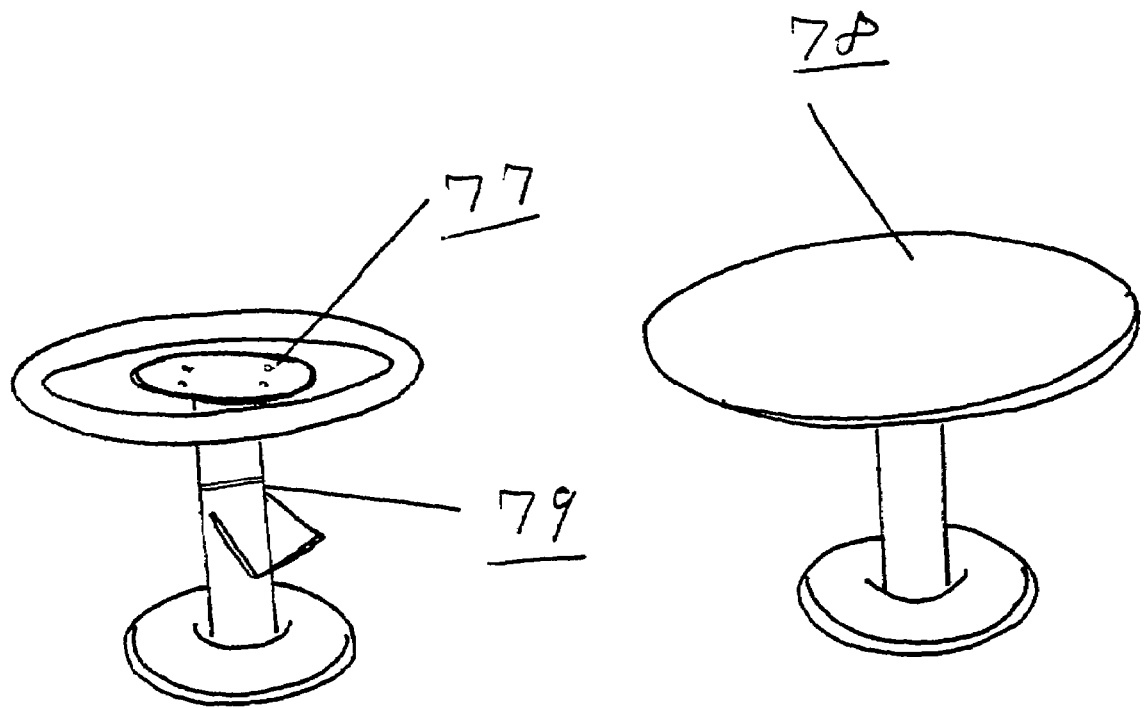
FIG. 23 is a side view of FIG. 20 that includes space saving table tops.
Figure 27:
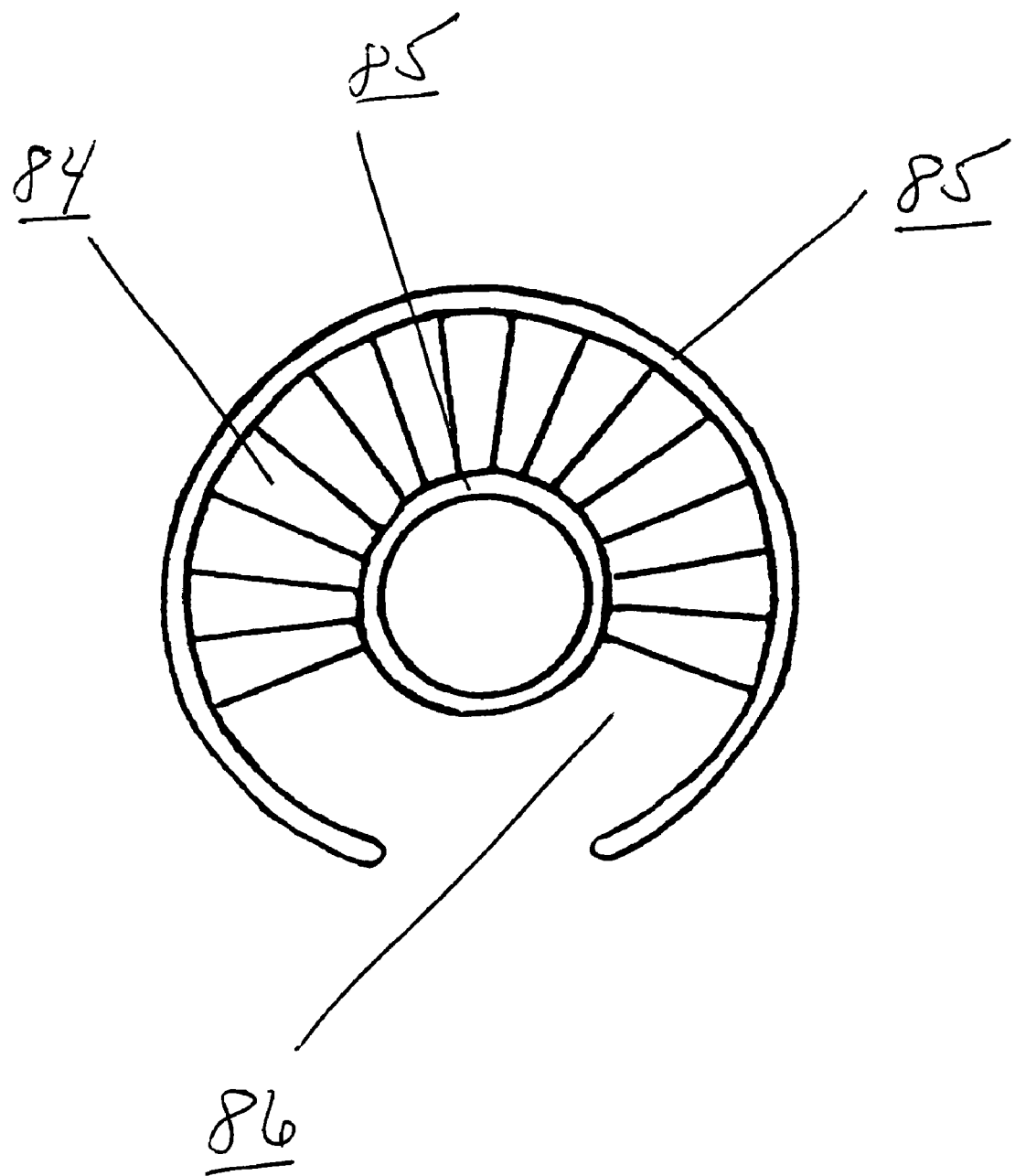
FIG. 27 is a top view of a space saver variation of the application of FIG. 26 that uses half of the present invention.

FIG. 23 is an alternate view of FIG. 20 showing a configuration for space saving optional tabletops 78 to the upper surface of column 77. An optional hydraulic lift column mechanism 79 adjusts the height of the curved rails and the tabletops. FIG. 27 shows another space saver variation, that uses half of the figure-eight walking course and track. In this embodiment, stepping inclines 84 and 86 may be used with rail inclines 85.

Figure 25:
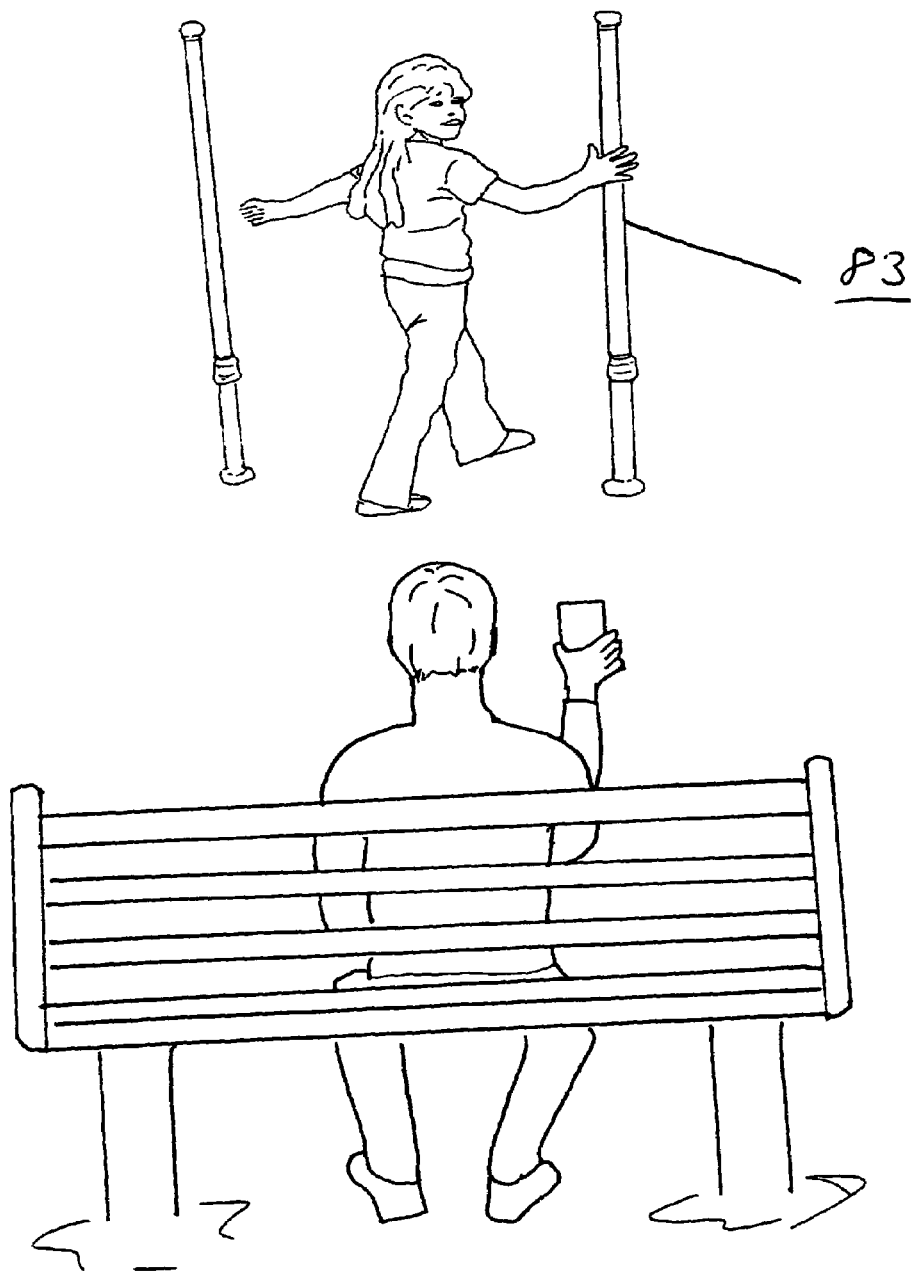
FIG. 25 shows an alternate game application of the present invention.

A game kit is disclosed, FIG. 24, for both entertainment and education including two or more generally circular markers 80 that delineate the inner boundary of an imaginary figure-eight path around which one or more players 82 traverse, (i.e. walk, crawl, hop, skip, ride, swim, jog, etc.). The game requires an active physical participation of one or more players 82 causing exercise of human body and successive skill building in multiple areas of human competencies. In alternative embodiment, vertical guides 83 may be used as markers (FIG. 25).

The game kit also includes a plurality of cards 81 with each card having one or more surfaces with indicia imprinted thereon. Multiple decks of cards 81 represent topic instructions and skill-building activities including, but not limited to, coordination, attention, focus, speaking, listening, memory, rhythm, imagination, and general and specific knowledge bases.

In one embodiment of the game a player 82 must correctly respond to the instructions and topic of a succession of cards while traversing in a figure-eight manner around two or more circular markers 80. The players turn is over when the player accidentally touches a marker with any part of the body or clothing while responding to the instructions. In another embodiment of the invention, the player's challenge is increased every minute that the player does not touch the markers while traversing around them and carrying out the skill that is determined by the selection of a card. A player's turn ends when they cannot carry out the skill activity or accidentally touch a marker while trying.

The game includes multimedia alternatives to cards for presenting the instructions and topics, as well as templates and other resources for developing additional instructional and topic cards and media that represent greater skill challenges as the player progresses in game skill.

An extensive choice of optional game rules for playing the game, determining scoring, and establishing the end of the game adapts the game for ages three through senior adults; for individuals with learning, developmental, and physical challenges, for non-competitive group game playing, and for single player competing against their own score.

In all embodiments, the game is in play while a player is traversing in a figure-eight fashion, with or without the use of two or more markers. When markers are not used, the end or he players' turn is pre-determined by non-marker game rules that base a turn solely on the selected instructions and activities defined by the plurality of cards.

While the invention has been described with reference to specific embodiments, modifications and variations of the invention may be constructed without departing from the scope of the invention, which is defined in the following claims.

I claim:

1. Therapeutic integration walking apparatus comprising a therapeutic walking apparatus for human sensory-motor exercise, the walking apparatus including a walking course having a figure-eight configuration, the walking apparatus walking course having walking course borders forming an inner boundary of the walking course figure-eight configuration, the walking course borders delineating the walking course of the walking apparatus for human sensory-motor exercise, the walking course and the walking course borders providing a guide for walking and therapeutic integration of motor, sensory and cognitive functions to walkers using the walking apparatus.

2. The apparatus of claim 1, wherein the walking course borders on the inner boundary further comprise one or more curved rails and supports connected to the rails for supporting the rails above the inner boundary of the course.

3. The apparatus of claim 2, wherein the one or more curved rails are guiding rails.

4. The apparatus of claim 2, wherein the one or more curved rails are weight bearing rails.

5. The apparatus of claim 2, wherein the supports are preexisting supports, and the curved rails are attached thereto.

6. The apparatus of claim 2, wherein the supports are inner posts positioned inside the course inner boundary and wherein the curved rails extend outward from the posts.

7. The apparatus of claim 6, further including a tabletop disposed on the inner support posts.

8. The apparatus of claim 6, wherein the inner posts and curved rails forming the walking course inner boundary are portable.

9. The apparatus of claim 6, wherein the inner posts are vertically adjustable.

10. The apparatus of claim 2, wherein the one or more curved rails comprise at least a pair of vertically spaced curved rails.

11. The apparatus of claim 10, wherein the supports comprise a plurality of weight bearing supports connected to said at least pair of vertically spaced curved rails.

12. The apparatus of claim 1, further including walking course borders forming an outer boundary of at least part of the walking course figure-eight configuration.

13. The apparatus of claim 12, wherein the borders forming the outer boundary comprise upper rails supported on outer posts along the outer boundary.

14. The apparatus of claim 13, wherein the outer posts are vertically adjustable.

15. The apparatus of claim 14, further including a motor connected to the outer posts for vertically adjusting the outer posts.

16. The apparatus of claim 13, wherein the upper rails are horizontally adjustable on the outer posts.

17. The apparatus of claim 16, further including a motor connected to said upper rails for horizontally adjusting the upper rails on the outer posts.

18. The apparatus of claim 13, wherein at least some of the outer posts and the upper rails along the outer boundary of the walking course are swinging and gates to the walking course.

19. The apparatus of claim 18, wherein at least some portions of the upper rails are moveable gates admitting persons to the walking course.

20. The apparatus of claim 19, wherein some of the moveable gates are lockable in parallel position, whereby the locked gates may be used as parallel rails.

21. The apparatus of claim 9, wherein the inner support posts are vertically adjustable by a hydraulic lift mechanism.

22. The apparatus of claim 12, wherein the walking course comprises a platform track.

23. The apparatus of claim 22, wherein said platform track is comprised of a plurality of laterally connectable platform track sections, whereby the platform track is knockdown and easily transportable.

24. The apparatus of claim 22, further including movable step training accessories attached to said platform track, said step training accessories selected from the group consisting of stepping spacers, stepping guides, a center floor divider and a balance beam, said step training accessories attached to said platform track by doweled floor fastening means.

25. The apparatus of claim 22, wherein the platform track is comprised of an incline track, and the borders are inclined rails which match the incline of the incline track.

26. The apparatus of claim 25, wherein the incline track is comprised of stepping inclines.

27. A therapeutic integration walking method comprising providing a therapeutic walking apparatus having a walking course for human sensory-motor exercise, providing a figure-eight configuration of the walking apparatus walking course, providing walking course borders forming an inner boundary of the walking course figure-eight configuration, delineating the walking course of the walking apparatus, using the borders as guides and practicing walking on therapeutic integration of motor, sensory and cognitive functions while walking on a walking track.

28. The method of claim 27, wherein the providing walking course borders on the inner boundary further comprise providing one or more curved rails and supports connected to the rails for supporting the rails above the inner boundary of the course.

29. The method of claim 28, wherein the providing one or more curved rails comprises providing guiding rails.

30. The method of claim 28, wherein the providing one or more curved rails comprises providing weight bearing rails.

31. The method of claim 28, wherein the providing supports comprises providing preexisting supports, and providing the curved rails attached thereto.

32. The method of claim 28, wherein the providing supports comprises providing inner posts positioned inside the course inner boundary and extending the curved rails outward from the posts.

33. The method of claim 32, further including the step of providing a tabletop disposed on the inner support posts.

34. The method of claim 32, wherein providing inner posts and curved rails forming the walking course inner boundary comprises inner posts and curved rails that are portable.

35. The method of claim 32, wherein the providing inner posts comprises providing inner posts that are vertically adjustable.

36. The method of claim 28, wherein the providing one or more curved rails comprise providing at least a pair of vertically spaced curved rails.

37. The method of claim 36, wherein the providing supports comprise providing a plurality of weight bearing supports connected to said at least pair of vertically spaced curved rails.

38. The method of claim 27, further including the step of providing walking course borders forming an outer boundary of at least part of the walking course figure-eight configuration.

39. The method of claim 38, wherein the providing borders forming the outer boundary comprise providing upper rails supported on outer posts along the outer boundary.

40. The method of claim 39, wherein the providing outer posts comprises providing outer posts that are vertically adjustable.

41. The method of claim 40, further including the step of providing a motor connected to the outer posts for vertically adjusting the outer posts.

42. The method of claim 39, wherein the providing upper rails comprises providing upper rails that are horizontally adjustable on the outer posts.

43. The method of claim 42, further including the step of providing a motor connected to said upper rails for horizontally adjusting the upper rails on the outer posts.

44. The method of claim 27, further comprising the step of providing a point of focus positioned outside of the walking course.

45. The method of claim 44, wherein the providing a point of focus comprises a point of focus that is positioned near a plane perpendicular to the walking course at a midpoint of the walking course.

46. The method of claim 45, wherein the providing a walking course comprises providing a walking course made of two annular curves which are joined linearly and wherein the plane passes through the linear joining of the annular curves.

47. The method of claim 44, wherein the providing a point of focus further includes the step of providing visual and audible stimulations.

48. The method of claim 39, further comprising the step of providing at least some of the outer posts and the upper rails along the outer boundary of the walking course that are swinging and gates to the walking course.

49. The method of claim 48, further comprising the step of providing at least some portions of the upper rails that are movable gates admitting persons to the walking course.

50. The method of claim 49, further including the step of providing moveable gates that are lockable in parallel position, whereby the locked gates may be used as parallel rails.

51. The method of claim 49, further including the step of providing gates at intersections of the rails along outer boarders of the walking course and providing gates that extend inward allowing persons using the walking course to move to opposite sections of the walking course.

52. The method of claim 35, wherein the providing inner support posts that are vertically adjustable further comprises providing a hydraulic lift mechanism in the inner support posts.

53. The method of claim 38, wherein the providing a walking course comprises providing a platform track.

54. The method of claim 53, wherein the providing said platform track is comprised of providing a plurality of laterally connectable platform track sections, whereby the platform track is knockdown and easily transportable.

55. The method of claim 53, further including the step of providing movable step training accessories selected from the group consisting of stepping spacers, stepping guides, a center floor divider and a balance beam, and attaching the training accessories to said platform track by doweled floor fastening means.

56. The method of claim 53, wherein the providing a platform track is comprised of providing an incline track, and providing borders that are inclined rails which match the incline of the incline track.

57. The method of claim 56, wherein the providing an incline track is comprised of providing stepping inclines.

58. A physical and cognitive sensory walking training method for use on a figure-eight walking course comprising the steps of:
walking on connected loops of a figure-eight therapeutic integration walking course,
guiding a user using walking course borders while walking on said walking course,
focusing on an off walking course object while walking,
turning and rotating a user's body while being guided within walking course borders and while continuously focusing on said off walking course object,
practicing walking and practicing the integration of motor, sensory, and cognitive functions,
using hand rails along one or more borders of said walking course.

* * * * *